(12) United States Patent
Zaidi et al.

(10) Patent No.: US 11,876,582 B2
(45) Date of Patent: Jan. 16, 2024

(54) HYBRID BEAM STEERING RADAR

(71) Applicant: Metawave Corporation, Carlsbad, CA (US)

(72) Inventors: Abdullah Ahsan Zaidi, San Diego, CA (US); Kenneth Ray Carroll, Huntington Beach, CA (US); Soren Shams, Carlsbad, CA (US); Maha Achour, Encinitas, CA (US)

(73) Assignee: Metawave Corporation, Carlsbad, CA (US)

( * ) Notice: Subject to any disclaimer, the term of this patent is extended or adjusted under 35 U.S.C. 154(b) by 25 days.

(21) Appl. No.: 17/381,051

(22) Filed: Jul. 20, 2021

(65) Prior Publication Data

US 2022/0021419 A1 Jan. 20, 2022

Related U.S. Application Data

(60) Provisional application No. 63/054,201, filed on Jul. 20, 2020.

(51) Int. Cl.
*H04B 7/0426* (2017.01)
*H04B 7/08* (2006.01)
*H04B 7/06* (2006.01)

(52) U.S. Cl.
CPC .......... *H04B 7/043* (2013.01); *H04B 7/0686* (2013.01); *H04B 7/086* (2013.01); *H04B 7/0817* (2013.01); *H04B 7/0857* (2013.01)

(58) Field of Classification Search
CPC .... H04B 7/043; H04B 7/0686; H04B 7/0817; H04B 7/0857; H04B 7/086; G01S 7/354; G01S 7/356; G01S 13/4454; G01S 2013/0254

USPC ......................................................... 375/219
See application file for complete search history.

(56) References Cited

U.S. PATENT DOCUMENTS

| | | | |
|---|---|---|---|
| 9,297,896 B1 * | 3/2016 | Andrews | H01Q 3/30 |
| 2016/0054439 A1 * | 2/2016 | Brookner | G01S 13/91 |
| | | | 342/36 |
| 2017/0029107 A1 * | 2/2017 | Emami | G08G 5/0069 |
| 2017/0256855 A1 * | 9/2017 | Robinson | H01Q 3/34 |
| 2019/0353751 A1 * | 11/2019 | Raphaeli | G01S 7/292 |
| 2020/0341112 A1 * | 10/2020 | Itkin | G01S 7/4078 |
| 2020/0412424 A1 * | 12/2020 | Ray | G01S 7/2813 |
| 2021/0156982 A1 * | 5/2021 | Stettiner | G01S 13/931 |
| 2021/0263139 A1 * | 8/2021 | Ray | G01S 13/4445 |

(Continued)

*Primary Examiner* — Don N Vo

(57) ABSTRACT

Examples disclosed herein relate to a radar system for object identification. The radar system transmitting an azimuth fan beam and incrementing elevation of the beam. The radar system may include a transmit antenna and a receive antenna, each having a plurality of antenna elements arranged in rows and columns. The radar system may include a transceiver coupled to the transmit antenna and the receive antenna, the transceiver configured to control transmit beams having an azimuth fan beam, or an elevation fan beam. The radar system may include a processing unit. In various embodiments, the processing unit may include a digital processing unit; a range Doppler mapping module; and an azimuth detection module coupled to the transceiver. The azimuth detection module may be configured to process received signals and identify an azimuth angle of arrival by correlating signals received at antenna elements in rows of the receive antenna.

19 Claims, 25 Drawing Sheets

(56) References Cited

U.S. PATENT DOCUMENTS

| | | | |
|---|---|---|---|
| 2021/0364616 A1* | 11/2021 | Wang | G01S 13/343 |
| 2021/0373127 A1* | 12/2021 | Slobodyanyuk | G06F 17/141 |
| 2023/0092131 A1* | 3/2023 | Lao | G01S 13/34 |
| | | | 342/200 |

* cited by examiner

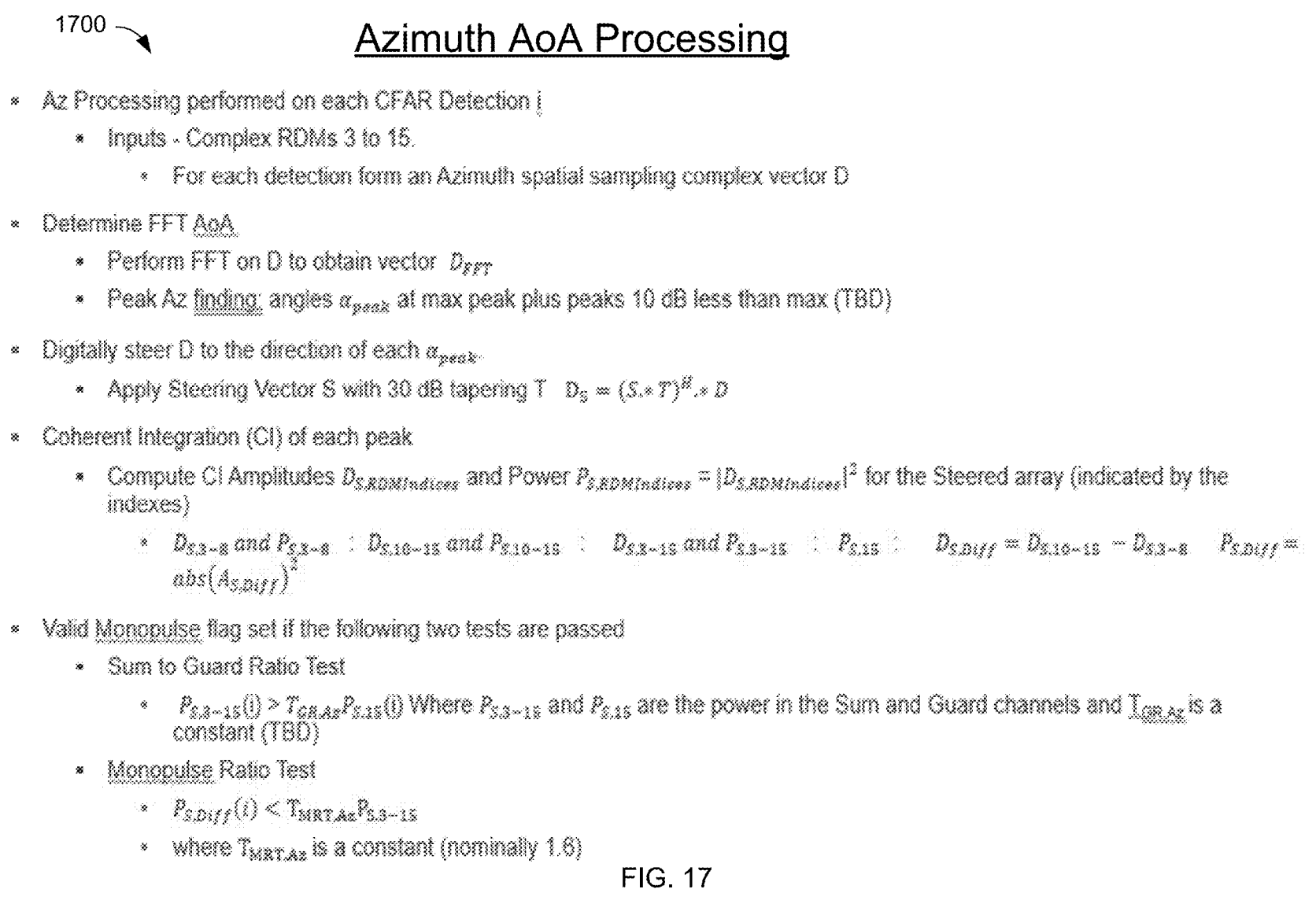

Azimuth AoA Processing

1700 ⟶

- Az Processing performed on each CFAR Detection j
  - Inputs - Complex RDMs 3 to 16.
  - For each detection form an Azimuth spatial sampling complex vector D

- Determine FFT AoA
  - Perform FFT on D to obtain vector $D_{FFT}$
  - Peak Az finding angles $\alpha_{peak}$ at max peak plus peaks 10 dB less than max (TBD)

- Digitally steer D to the direction of each $\alpha_{peak}$
  - Apply Steering Vector S with 30 dB tapering T $D_S = (S * T)^H * D$

- Coherent Integration (CI) of each peak
  - Compute CI Amplitudes $D_{S,RDM,index}$ and Power $P_{S,RDM,index} = |D_{S,RDM,index}|^2$ for the Steered array (indicated by the indexes)
    - $D_{S,3-8}$ and $P_{S,3-8}$ ; $D_{S,10-15}$ and $P_{S,10-15}$ ; $D_{S,3-15}$ and $P_{S,3-15}$ ; $D_{S,Diff} = D_{S,10-15} - D_{S,3-8}$ ; $P_{S,Diff} = abs(A_{S,Diff})^2$

- Valid Monopulse flag set if the following two tests are passed
  - Sum to Guard Ratio Test
    - $P_{S,3-15}(j) > T_{SG,Az} \cdot P_{G,15}(j)$ Where $P_{S,3-15}$ and $P_{G,15}$ are the power in the Sum and Guard channels and $T_{SG,Az}$ is a constant (TBD)
  - Monopulse Ratio Test
    - $P_{S,Diff}(j) < T_{MR,Az} \cdot P_{S,3-15}$
    - Where $T_{MR,Az}$ is a constant (nominally 1.6)

FIG. 17

Azimuth AoA Processing

- Angle Measurement and variance estimate

- $\theta_{az}(t) = \frac{\theta_{BW}}{\pi} \tan^{-1}\left( \text{Re}\left( \frac{D_{3,diff}(t)}{D_{3,3-15}(t)} \right) \right)$

- $\sigma^2_{az}(t) = \frac{K_3}{\pi} \left( \frac{\theta_{BW}}{CSN(t)} \right)^2 + K_{Noise}$

- Where $\theta_{BW} = \theta_{BW,boresight}/\cos\theta_{Steer}$ = is the beam width, $D_{3,diff}$ is the complex amplitude of the Difference ROM, $D_{3,3-15}$ is for the Sum

FIG. 18

Elevation Monopulse Processing

1900

- Monopulse Processing performed on each Detection j from CFAR processing
  - Inputs - Complex RDM 1,2,3,4 and 16

- Coherent Integration (CI) of CFAR RDM Bins j
  - Compute CI Amplitudes and Power for the combinations of RDMs (indicated by the indexes)
    - $A_{1,2}$ and $P_{1,2}$ ; $A_{3,4}$ and $P_{3,4}$ ; $A_{1,2,3,4}$ and $P_{1,2,3,4}$ ; $P_{16}$ ; $A_{Diff} = A_{1,2} - A_{3,4}$  $P_{Diff} = abs(A_{Diff})^2$

- Valid Monopulse flag set if the following two tests are passed
  - Sum to Guard Ratio Test
    - $P_{1,2,3,4}(j) > T_{GR} * P_{16}(j)$ Where $P_{1,2,3,4}$ and $P_{16}$ are the power in the Sum and Guard channels and $T_{GR}$ is a constant (TBD)
  - Monopulse Ratio Test
    - $P_{Diff}(j) < T_{MRT} \text{ of } P_{1,2,3,4}(j)$
    - where $T_{MRTel}$ is a constant (nominally 1.6)

- Angle Measurement and variance estimate
  - $\theta_{el}(j) = \dfrac{\theta_{BW}}{\pi} \tan^{-1}\left( Re\left( \dfrac{A_{Diff}(j)}{A_{1,2,3,4}(j)} \right) \right)$
  - $\sigma^2_{el}(j) = \dfrac{K_1}{\pi}\left(\dfrac{\theta_{BW}}{SNR(j)}\right)^2 + K_{Floor}$
  - Where $\theta_{BW} = \theta_{BW,boresight} / \cos\theta_{steer}$ = is the beam width, $A_{diff}$ is the complex amplitude of the Difference RDM, $A_{1,2,3,4}$ is for the Sum RDM, SNR is the signal to noise ratio, K1 and $K_{Floor}$ are constants (TBD)

FIG. 19

Az AoA Using Music (DSP)

2100

- Estimate the covariance matrix for the signal and noise subspaces for each CFAR detection i.
  - Form the Data Matrix X from the az spatial vector D of size N=13 (nominal). Assume a spatial window of M = 10 (nominal). Note indexes start from zero for the following.

$$X = \begin{bmatrix} d(0) & d(1) & \cdots & d(M-2) & d(M-1) \\ d(1) & d(2) & \cdots & d(M-1) & d(M) \\ \vdots & \vdots & \ddots & \vdots & \vdots \\ d(N-M-1) & \cdots & \cdots & d(N-3) & d(N-2) \\ d(N-M) & \cdots & \cdots & d(N-2) & d(N-1) \end{bmatrix}$$

- $R = X^H X$ where H is complex transpose. (Note R is a M×M matrix)

- Determine M eigenvalues $\lambda_n$ and corresponding M eigenvectors $q_n$ using SVD
  - Sort the eigenvalues in descending order

- Determine Number of Signals
  - Compute the AIC statistic assuming $0 < d_s < M-1$ signals $$AIC(d_s) = -K(M-d_s)\log\left(\frac{\prod_{n=d_s+1}^{M}\lambda_n^{\frac{1}{M-d_s}}}{\frac{1}{M-d_s}\sum_{n=d_s+1}^{M}\lambda_n}\right) + d_s(2M-d_s)$$

- Where K = 8
- Number of Signals $P = d_{s,min}$ is the index with the minimum AIC statistic

FIG. 21

Az AoA Using Music (DSP)

- Perform root music
    - Form the matrix $Q$ from the noise eigenvectors
        - $Q_{noise} = [q_{P+1} \quad q_2 \quad \cdots \quad q_{M-2} \quad q_{M-1}]$
    - Form the matrix
        - $C = Q_{noise} Q_{noise}^H$
    - Determine the 2M-1 polynomial coefficients $C_l$ which are the sum of the $l$th diagonal
        - $C_l = \sum_{l=n-m} C_{mn}$
- Polynomial equation to find the complex roots $z$
    - $\sum_{l=-M+1}^{M-1} C_l z^l = 0$
- Form the Companion Matrix B for the polynomial
    - Normalize the coefficients $c_l = C_l / C_{M-1}$ $$B = \begin{bmatrix} 0 & 1 & 0 & \cdots & 0 \\ 0 & 0 & \ddots & & 0 \\ 0 & 0 & 0 & \ddots & 1 \\ -c_{-M+1} & \cdots & & & -c_{M-2} \end{bmatrix}$$

- Determine the eigenvalues $z_{n,root}$, using SVD, QR Decomposition or equivalent

FIG. 22

Az AoA Using Music (DSP)

- Find the P roots closest to a magnitude of 1
  - Sort in descending order $|z_{k,root}|$ $for\ all\ k\ of\ |z_{k,root}| \le 1$
  - Select the first P roots as the signals
- Compute the Azimuth AoA
  - Compute the phase of the P signals
    - $\phi_p = atan(Im(z_{p,root})/Re(z_{p,root}))$
  - Azimuth of the signals 1:P
    - $\theta_p = \frac{180}{\pi} asin(\frac{\lambda}{2d_{Az}}\phi_p)$ in degrees
    - Where $d_{Az}$ is the azimuth element spacing

HYBRID BEAM STEERING RADAR

CROSS-REFERENCE TO RELATED APPLICATIONS

This application claims priority from U.S. Provisional Application No. 63/054,201, filed on Jul. 20, 2020, which is incorporated by reference in its entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. The requirements for object and image detection are critical and specify the time required to capture data, process it and turn it into action. All of the aforementioned tasks are to be performed while ensuring accuracy, consistency and cost optimization.

An aspect of making this work is the ability to detect and classify objects in the surrounding environment at the same or possibly at an even better level than humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment. Therefore, there is a need for a system that can perform human-like sensing and intelligence-based decision-making capabilities suitable for use in real time autonomous driving.

BRIEF DESCRIPTION OF THE DRAWINGS

The present application may be more fully appreciated in connection with the following detailed description taken in conjunction with the accompanying drawings, which are not drawn to scale, in which like reference characters refer to like parts throughout, and in which:

FIGS. 17-18 illustrate a method for azimuth angle of arrival processing in a hybrid beam steering radar system, in accordance with various implementations of the subject technology;

FIG. 19 illustrates a method for elevation monopulse processing in a hybrid beam steering radar system, in accordance with various implementations of the subject technology;

FIGS. 21-23 illustrate azimuth angle of arrival processing in a hybrid beam steering radar system, in accordance with various implementations of the subject technology;

DETAILED DESCRIPTION

Figure 1:
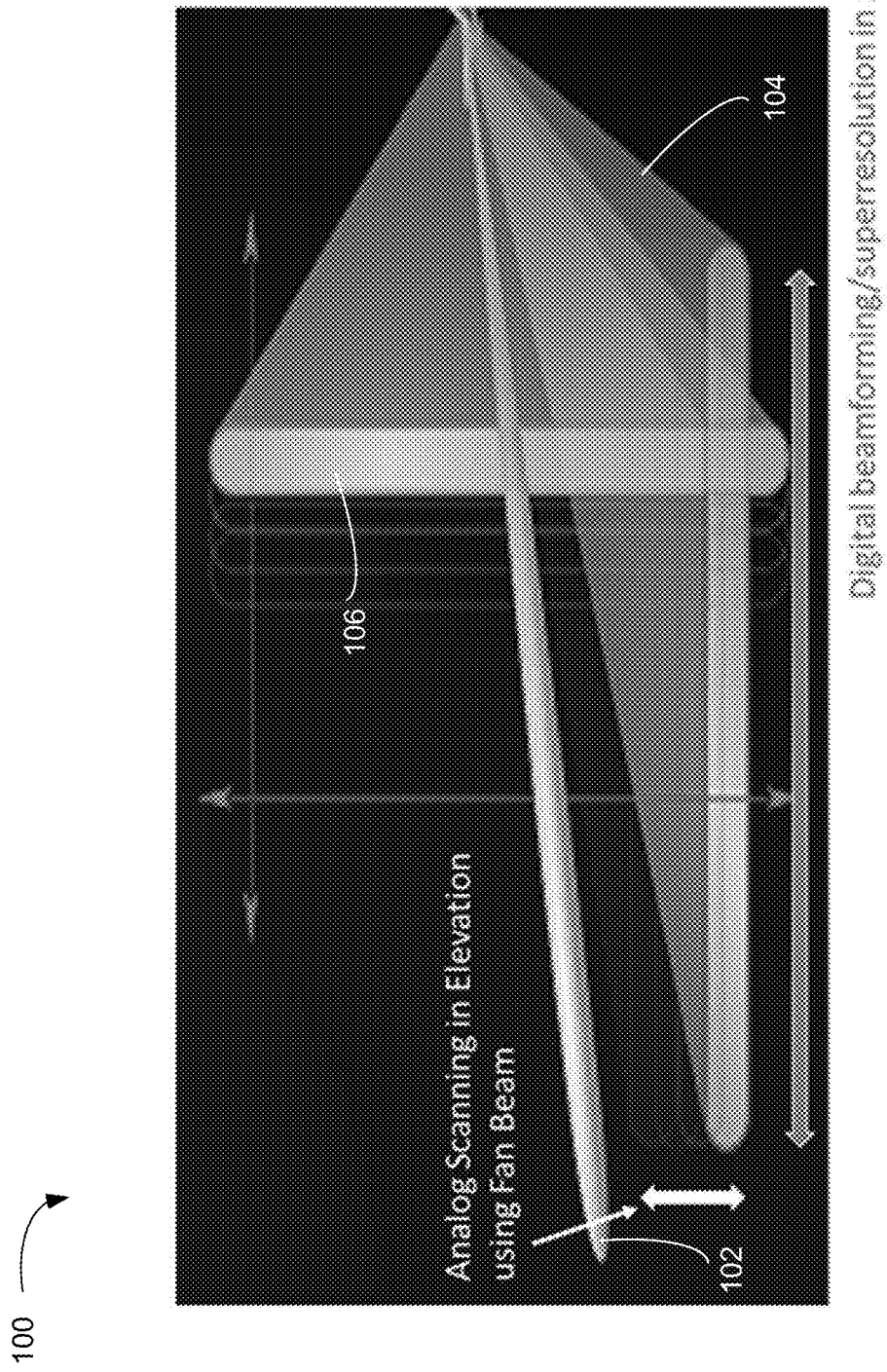
FIG. 1 illustrates elevation and azimuth operation of a hybrid beam steering radar, such as for an autonomous vehicle, used to detect and identify objects, according to various implementations of the subject technology.

The present disclosure generally relates to systems and methods of operating a hybrid radar system that can be used in autonomous driving. For object detection in a radar system, for example, signals are transmitted using a modulation enabling acquisition of information from the analog signals directly. One such system employs Frequency Modulation Continuous Waveform ("FMCW") techniques to capture range and velocity directly from the received signals. At each angle of arrival (AoA), the generated beam has a bandwidth or beam width, generally measured at the half power gain, or −3 dB. The angular resolution of the radar system is thus limited by this beam width as multiple objects therein are not easily distinguished.

The present disclosure provides methods and apparatuses to refine angular resolution of an object detection system, and specifically of a radar system using a guard band antenna to effectively identify and resolve multiple objects. The radar disclosed herein is a beam steering radar capable of generating narrow, directed beams that may be steered to any angle (i.e., from 0° to 360°) across a Field of View ("FoV") to detect objects. These radar solutions and examples provided herein illustrate 2-D angles of transmission, enabling object detection in two planes of the FoV. The beams are generated and steered in the analog domain, while processing of received radar signals for object identification is performed with advanced signal processing and machine learning techniques. In various implementations, objects are detected in a received radar signal with the help of one or more guard band antennas to effectively resolve multiple objects inside a main beam with a high degree of accuracy and angular resolution. Radar angular resolution, as generally described herein, is the minimum distance between two equally large objects at the same range which the radar is able to distinguish and separate from each other.

It is to be understood that for transmission of a signal, propagation flows from a signal source through a phase shifter which adjusts the phase of one or more radiating elements in an antenna array to direct a radiation beam. The waveform of the transmitted signal may be described as:

$$s(t)=A\cdot\sin[2\pi f(t)\cdot t+\varphi(t)]$$

wherein A is the amplitude modulation, a variation of the amplitude as a function of time, t, f is the frequency of the signal, and $\varphi$ is the phase of the signal. A variety of applications and configurations are possible. In a radar system, specifically, a receive antenna responds to reflections or echoes of signals from objects in the environment. The received signals are compared to the transmitted signal to identify a range and velocity of the objects. For objects at the same range and velocity, the received signals may create a false impression and indicate a single object at an intermediate location.

In operation, the receive antenna elements scan an area with a radiation beam having a main lobe and side lobes. Information regarding objects is obtained from the main lobe, and the side lobes are removed or ignored. One technique to remove, or identify, the side lobes of the radiation beam is to use a guard band antenna. A guard band antenna generates a radiation pattern separate from the main beam and is effective to eliminate side-lobe returns from objects. The goal is for the guard band antenna to provide a gain that is higher than the side lobes and therefore enable their elimination. The guard band antenna effectively acts as a filter.

It is appreciated that the detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

FIG. 1 illustrates steered electromagnetic beams from a hybrid beam steering radar system 100 enabling object detection in multiple dimensions of space, which are illustrated in vertical (elevation) and horizontal (azimuth) directions with respect to the radar. The radar system in the present examples generates a broad beam 102 in the azimuth direction, indicated by the fan beam 104 and increments a narrow beam in the elevation angle, which is incremented over a range of elevation angles. Transmissions are illustrated in FIG. 1, wherein the range of elevation angles is indicated by elevation increment range 106. In this way, the fan beam 104 is incremented to complete a scan of the multi-dimensional FoV.

Figure 2:
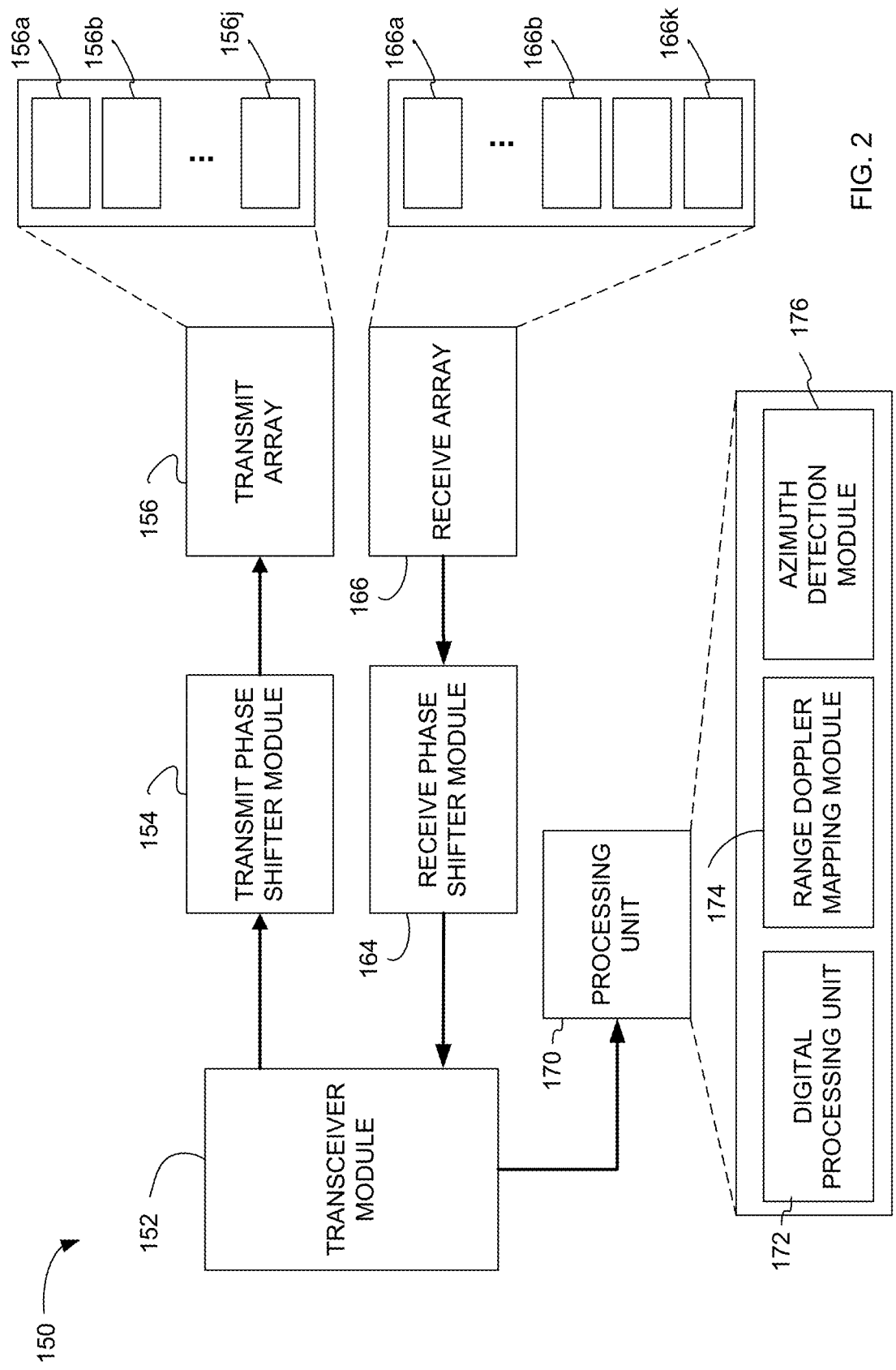
FIG. 2 illustrates a block diagram of a hybrid beam steering radar system and its functions, in accordance with one or more implementations of the subject technology.

FIG. 2 illustrates a hybrid beam steering radar system 150 configured to generate scanning beams as in FIG. 1 and includes transceiver module 152 (also referred to herein as transceiver 152) in the transmit path and the receive path. As illustrated in FIG. 2, the transmit path includes a path from the transceiver module 152 to transmit phase shifter module 154 and to transmit array 156. Similarly, the receive path includes a path from a receive array 166 to receive phase shifter module 164 and to transceiver module 152.

In various implementations, the transceiver module 152 includes a waveform generator, power amplifier and other components (not shown) to facilitate signal transmission. The transceiver module 152 has the ability to support both transmit operation and receive operation. The transceiver module 152 includes filters, low noise amplifiers and other components (not shown) to facilitate receive operations. During transmit operation, transceiver module 152 generates modulated waveforms, such as by frequency modulated continuous waveform (FMCW), for transmission. The transmit array 156 is the source transmission of a waveform in the FoV, which is a fan beam in azimuth and a narrow beam in elevation. The waveform is a repeating frequency signal of electromagnetic waves. It is steered by phase shifting the components of the transmit signal, which then propagates over the air from the antenna array 156 within a FoV. The radar system 150 is designed to detect objects within the FoV and distinguish objects of interest, targets, from noise from other objects. This is the case where the radar system 150 detects a vehicle but ignores a small bird. When the transmission signal contacts a target in the FoV, energy reflects, sometimes referred to as backscatter, in the direction of the radar system 150 and excites the receive antenna array 166. The transmit antenna array 156 is composed of one or more arrays of radiating elements, 156a, 156b, through 156j. The transmit beam interacts with a target and reflects at least a portion of the incident waveform energy from the transmit array 156 back to the receive array 166. The receive array 166 is composed of one or more arrays of radiating elements 166a, 166b, through 166k.

In accordance with various implementations, radar system 150 is configured to apply phase shift(s) to one or more paths propagating signals to one or more radiating elements of the transmit array 156 to generate a transmission beam; the transmission beam is a composite of the individual beams from the radiating elements. The applied phase shift(s) are coordinated with phase shift(s) applied to receive signals from receive array 166. The receive array 166 collects energy reflected from the target(s) from a surrounding or a vicinity. The transmission beam is compared to the received signals to determine range, angle of arrival and potential other information on detection of a target, as the target acts to reflect or return the transmission signal. The transmission beam is a broad fan beam in one direction and is incremented in a second direction. In the present examples, the fan beam is in the azimuth direction, while the beam is incremented in elevation.

The transmit path is from transceiver module 152 to transmit phase shifter module 154 and finally to transmit array 156. Transceiver module 152 is coupled to transmit phase shifter module 154 having one or more phase shifting elements applied to the transmission signal so as to shift the waveform transmitted at individual radiating elements of the transmit array 156. The phase shift is introduced for beamforming and beam steering. In this way, the transmit array 156 generates a fan beam in the azimuth and steers the beam in elevation. Transmit array 156 includes one or more individual arrays of elements, such as in columns or rows. Each individual array 156a, 156b, through 156j, corresponds to a specific area in the azimuth and may be used to identify a target location as discussed herein.

The receive path is from receive array 166 to receive phase shifter module 164, transceiver module 152 and finally to processing unit 170. Transceiver module 152 is coupled to receive phase shifter module 154 having one or more phase shifting elements applied to the received signal(s) so as to correspond to the transmitted waveform. This comparison provides information related to Doppler shift, phase shift and frequency shift in the received signal to determine range and angle of arrival information. This information is extracted in the transceiver module 152 and forwarded to processing unit 170 for further identification of the location of a detected target.

For transmissions forming the scanning beams as in FIG. 1 where scanning a FoV involves transmitting a fan beam at each of a set of incremented elevation angles. The specific configuration and operation of radar system 150 is provided for clarity of understanding and it is understood that the elevation and azimuth may be reversed, wherein a fan beam is transmitted in elevation and a narrow beam in azimuth.

Continuing with the transceiver module 152 and transmit phase shifter module 154 set the elevation angle, wherein a target within the FoV at a given elevation angle may be anywhere within the azimuth direction. To determine the azimuth direction, the processing unit 170 correlates signals received at the radiating elements of the receive array 166. In some embodiments, this employs a super resolution method enabling the system 150 to distinguish between multiple targets in close proximity.

The radar system 150 increments the elevation angle of transmissions so that the fan beam in the azimuth is transmitted at various elevations. In some embodiments, the radar system 150 increments the radar beam in successive elevations, e.g., elevation angles. In some embodiments, the radar system 150 covers a span of elevation angles as a function of radar performance, desired FoV or other criteria, wherein the elevation angles are not necessarily applied in order, e.g., sequentially order. In some embodiments, the elevation angles may be applied in a predetermined order, e.g., based on input from other sensors, e.g., camera or lidar.

The processing unit 170 operates on detection of a target or object in the FoV of the radar, and determines a range to the target, the Doppler shift in return signal, and other parameters. The elevation angle provides a vertical location of the target, while modules within processing unit 170 determine a horizontal component of the target location. The processing unit 170 includes a digital processing unit 172, a range Doppler mapping (RDM) module 174 and an azimuth detection module 176. The digital signal processing (DSP) unit 172 is configured to translate the analog signals received from the transceiver module 152 into digital signals for computation of target analytics. The transceiver module 152 provides return signals in analog form, after phase shift adjustment, organized for correlation and analysis of signals received at a given elevation across the azimuth FoV. The digital processing unit 172 takes this information converts the analog to digital signals. The digital information is provided to RDM module 174, which compares the received signal to transmitted signal to determine range, change in phase, change in frequency, velocity, angle of arrival and so forth. The azimuth detection module 176 is configured to evaluate the signals received across the fan beam in the azimuth so as to apply a super resolution method to identify azimuth location. Note that the monopulse channels are not limited to the number of subarrays of the examples provided herein, and more may be implemented as a function of the number of data channels available. In some embodiments, there are equal number of monopulse channels on the top and the bottom of the receive channel.

Figure 3:
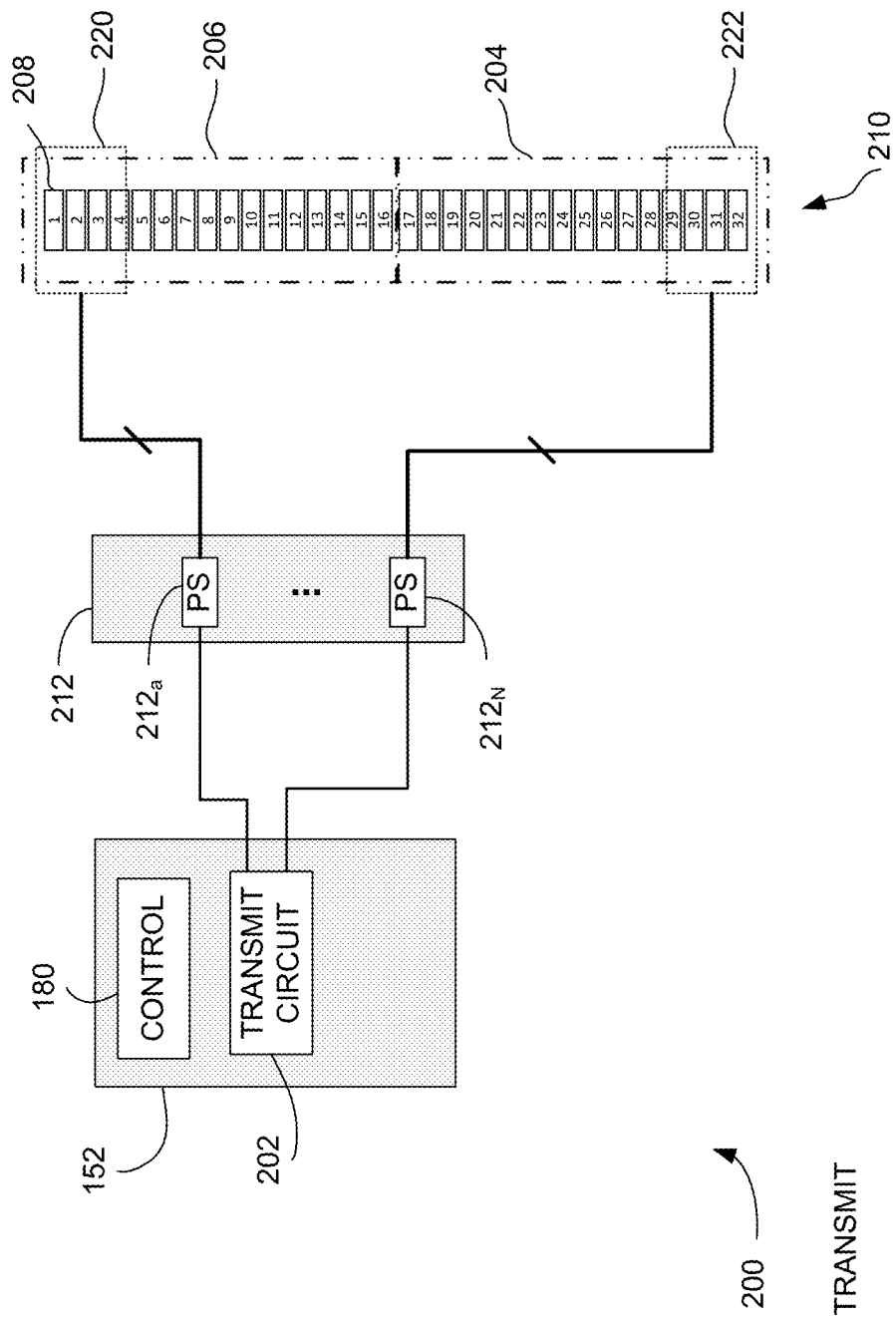
FIG. 3 illustrates a transmit portion of a hybrid beam steering radar system, in accordance with one or more implementations of the subject technology.

FIG. 3 illustrates a transmit portion 200 of radar system 150 as in FIG. 2 and for generating scanning beams as in FIG. 1. Portions of the transceiver module 152 illustrated in this perspective include a control unit 180, such as a microcontroller or application specific integrated circuit (ASIC), and transmit circuitry 202 as described hereinabove. The transceiver module 152 is coupled to millimeter integrated circuit (MMIC) 212, which is a radio frequency integrated circuit (RFIC), having at least one phase shift circuit, such as PS $212_a$, and may include multiple phase shift circuits $212_N$ through $212_{N'}$. The transmit antenna array 210 in this embodiment includes multiple portions or channels 208, which are grouped into multiple sets 206, 204. Within set 206, several channels are grouped together, such as group 220, wherein each group is then coupled to a phase shift circuit. As illustrated, group 220 is coupled to phase shifter $212_N$, and group 222 is coupled to phase shifter $212_{N'}$. There may be a variety of configurations which are implemented depending on the ports and capabilities of the phase shifters, MMIC 212, and transmit antenna array 210.

Figure 4:
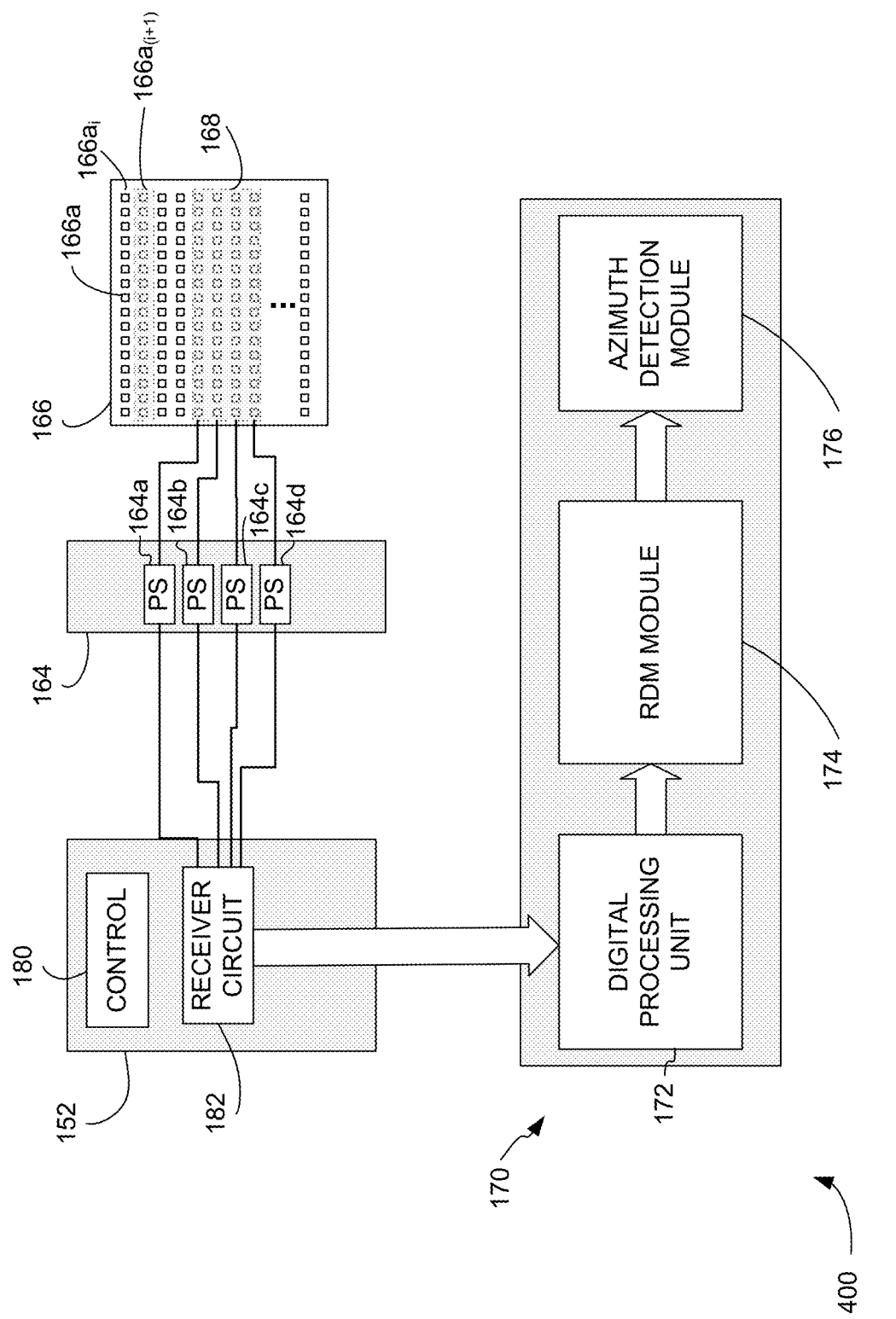
FIG. 4 illustrates receive portion of a hybrid beam steering radar system, in accordance with one or more implementations of the subject technology.

FIG. 4 illustrates a receive portion 400 of radar system 150 for the receive path from receive array 166. The array 166 includes a plurality of radiating elements, such as element 166a, organized in rows, such as $166a_i$ and $166a_{i+1}$, and into arrays, such as array 168. There is a plurality of phase shift elements 164a through 164d in phase shifter module 164. The rows of array 168 are coupled to the phase shifters 164a through 164d, wherein return signals received at the radiating elements 166a are phase shifted corresponding to the phase shift applied to the transmit signal. In this way, a beam transmitted from the transmit array 156 is directed in a designated elevation across a broad azimuth range as illustrated in FIG. 1. Corresponding phase shifts applied to the signal(s) received at the receive array 166 indicate the elevation of the target from which signals (echoes) return to radar system 150. The receive array 166 is organized into subarrays, such as array 168, and others. Each row of receive array 166 is coupled to a phase shifter within phase shifter module 164. In some embodiments, the phase shifters 164a through 164d are radio frequency (RF) millimeter wave integrated circuits (MMIC) or referred to as RFIC. FIG. 4 illustrates the receive path from array 168 for clarity of understanding. There may be any number of phase shifters within phase shifter module 164. Continuing with array 168, the phase shifted signals are sent to receiver circuit 182 within transceiver module 152, wherein operation of transceiver module 152 is managed by control unit 180. At transceiver module 152, temporal and spatial information is extracted relating to the transmit signal as received at arrays within receive array 166. The various components in the receive path, including receiver circuit 182, are configured to amplify received signals to detect pulse envelopes, amplify pulses, which are fed to the processing unit 170 for processing as described above. As illustrated in FIG. 4, received signals are provided to digital processing unit 172, RDM module 174 and azimuth detection module 176. The azimuth direction is a fan beam and therefore the location of a target in the azimuth is calculated based on signal strength at elements, such as element 166a, and the relationship between the elements.

Figure 5:
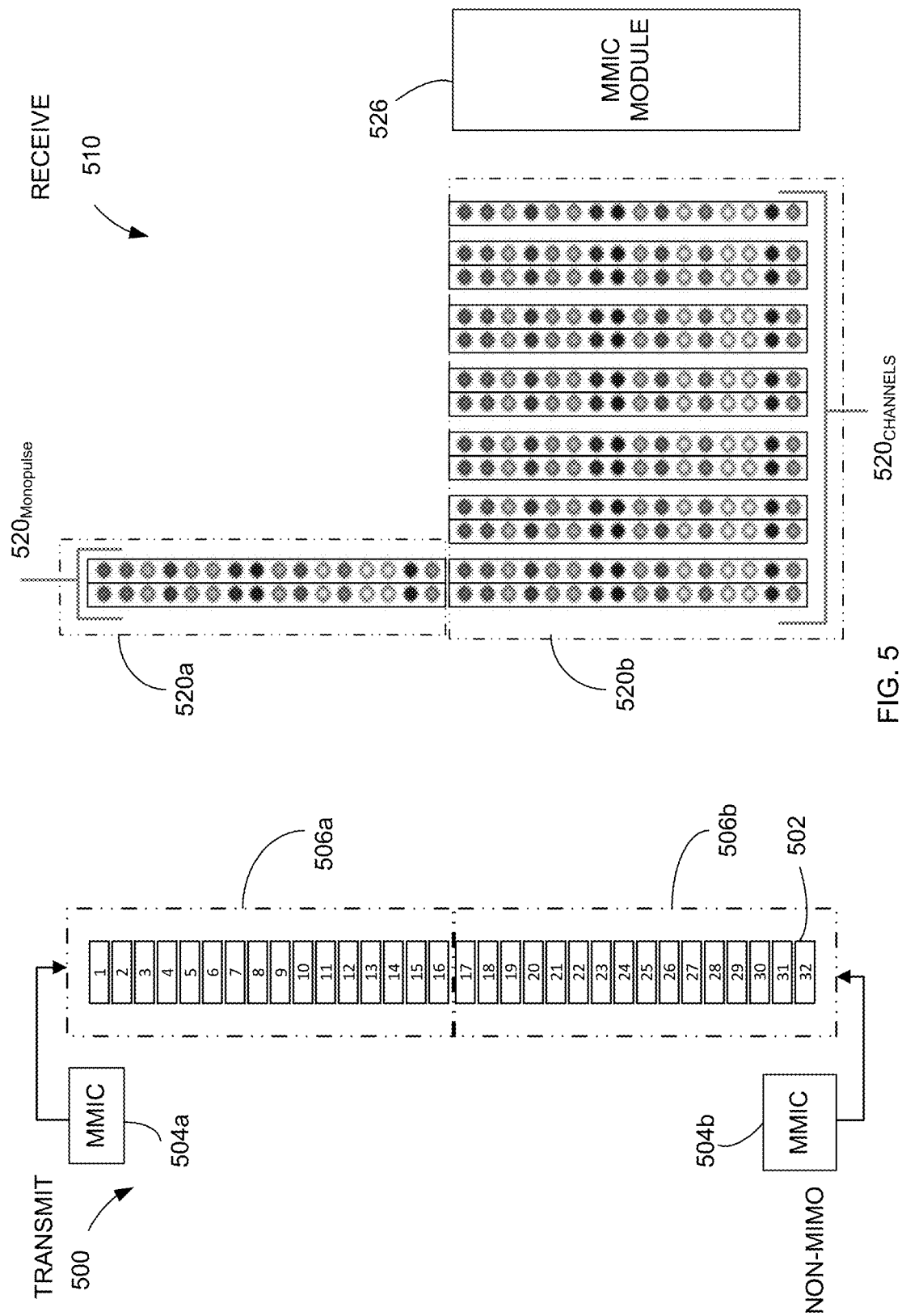
FIG. 5 illustrates antenna arrays of a hybrid beam steering radar system, in accordance with various implementations of the subject technology.

FIG. 5 illustrates transmit antenna 500 and receive antenna 510 in an example implementation of radar system 150 as in FIG. 1. The transmit antenna 500 has multiple radiating elements 502, which make up two channels 506a, 506b, and corresponding MMIC modules 504a, 504b for controlling the phase of transmission signals on the channels. The antenna is an array of two channels, each having 16 radiating elements 502, which include radar signal elements and may include guard band elements. Although FIG. 5 shows 32 total radiation elements 502, it is merely an example configuration, and thus any number of radiation elements 502 (or number of channels) can be included in the transmit antenna 500. As further illustrated, the MMICs 504a, 504b are configured to control the phase, or phase shift, of signals that are transmitted from channels 506a, 506b, respectively, to generate a broad azimuth beam and scan a series or set of elevation angles.

When the transmit antenna 500 transmits signals over the air to detect objects, the radar signals reflect off target objects and the reflected or returned signals are received at receive antenna 510. The receive antenna 510 includes multiple portions including 520a, 520b. As illustrated in FIG. 5, the portion 520a, for example, includes two channels, and the portion 520b, for example, includes 13 channels. The exact number of channels 520a and 520b are illustrated as examples and thus any number of channels 520a and 520b can be implemented in any configuration. An MMIC module 526 is configured to apply phase shifts to received paths, wherein a phase shifter is coupled to each receive channel. Each receive portions includes radar signal elements and may include guard bands and monopulse elements.

The radar system 150 with transmit antenna 500 and receive antenna 510 has $N_{Tx}$ transmit channels and $N_{Rx}$ receive channels. The receive channels are positioned to provide a phase shift across channels and thus increase the sampling of the return signals. The radar system 150 employs an FMCW modulated radar signal, and receive processing, including e.g., digital processing, to identify an azimuth angle of arrival. The more received samples, the greater resolution and accuracy of object detection. These processes are discussed hereinbelow. By adding transmitting channels, the resolution and accuracy of object detection is improved. Such a solution is a multiple-input multiple-output (MIMO) configuration. Increasing the transmit channels, or number of radiating elements, enables sharper digital processing of received signals to identify location. Specifically, using an Fast Fourier Transformation (FFT) process, the additional transmit channels provide a sharper peak in the RDM and a corresponding improvement in accuracy of angle estimation, such as angle of arrival, and angular resolution. The system effectively receives more information at the receive antenna and thereby virtually increases the number of receive elements. This technique for improving results may be applied to the radar system 150 by the addition of transmit antenna elements and increase the angular resolution capability of the radar.

Figure 6:
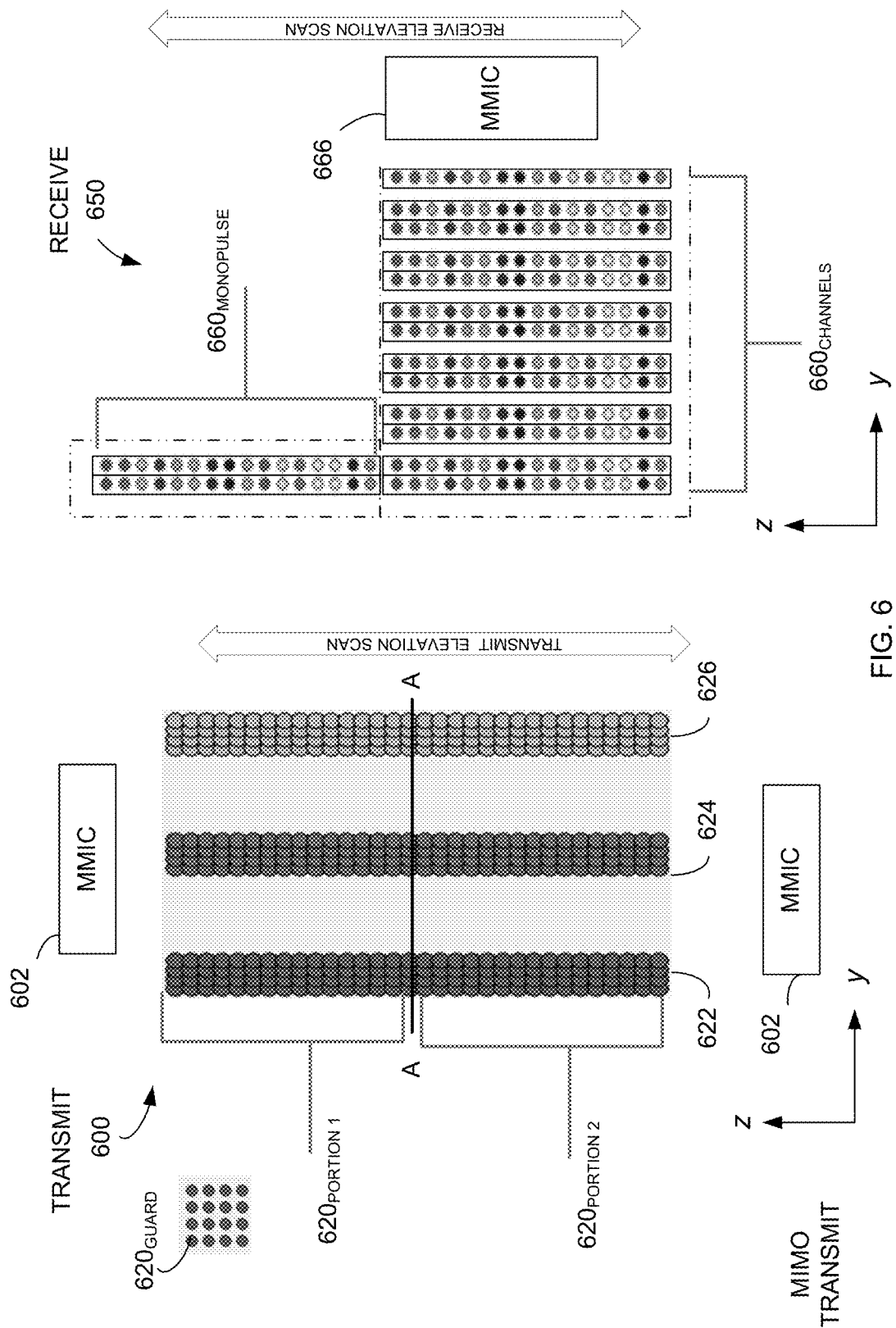
FIG. 6 illustrates antenna arrays of a MIMO hybrid beam steering radar system, in accordance with one or more implementations of the subject technology.

FIG. 6 illustrates a MIMO antenna configuration for a radar system, as in FIG. 2. Here the MIMO is implemented by transmit antenna 600 having transmit antenna 622 and additional, similar transmit antennas 624, 626, increasing the number of transmission signals and the reflections of targets. Each of transmit antenna 622, 624, 626, has multiple channels in they direction and multiple radiating elements in the z direction. The receive elevation scan is indicated in direction z, and each column corresponds to a different location in direction y. The transmit antenna 600 is illustrated with multiple arrays to implement multiple input-multiple output (MIMO) operation. The multiple transmit arrays improve resolution in azimuth to enable full multi-dimensional detection. Further, two MMICs 602 can be included the MIMO antenna configuration as illustrated in FIG. 6.

The transmit array 600 has multiple portions, $620_{PORTION1}$ and $620_{PORTION2}$ separated by line A-A. In addition, transmit array 600 has a guard elements $620_{GUARD}$. The receive array 650 includes two portions, $660_{CHANNELS}$ and $660_{MONOPULSE}$. In this example, there are 15 channels, made up of 13 channels of $660_{CHANNELS}$, and 2 channels for $660_{MONOPULSE}$ monopulse, which are compared when received at the receive array 650. MMIC 666 is included in the receive array 650.

Figure 7:
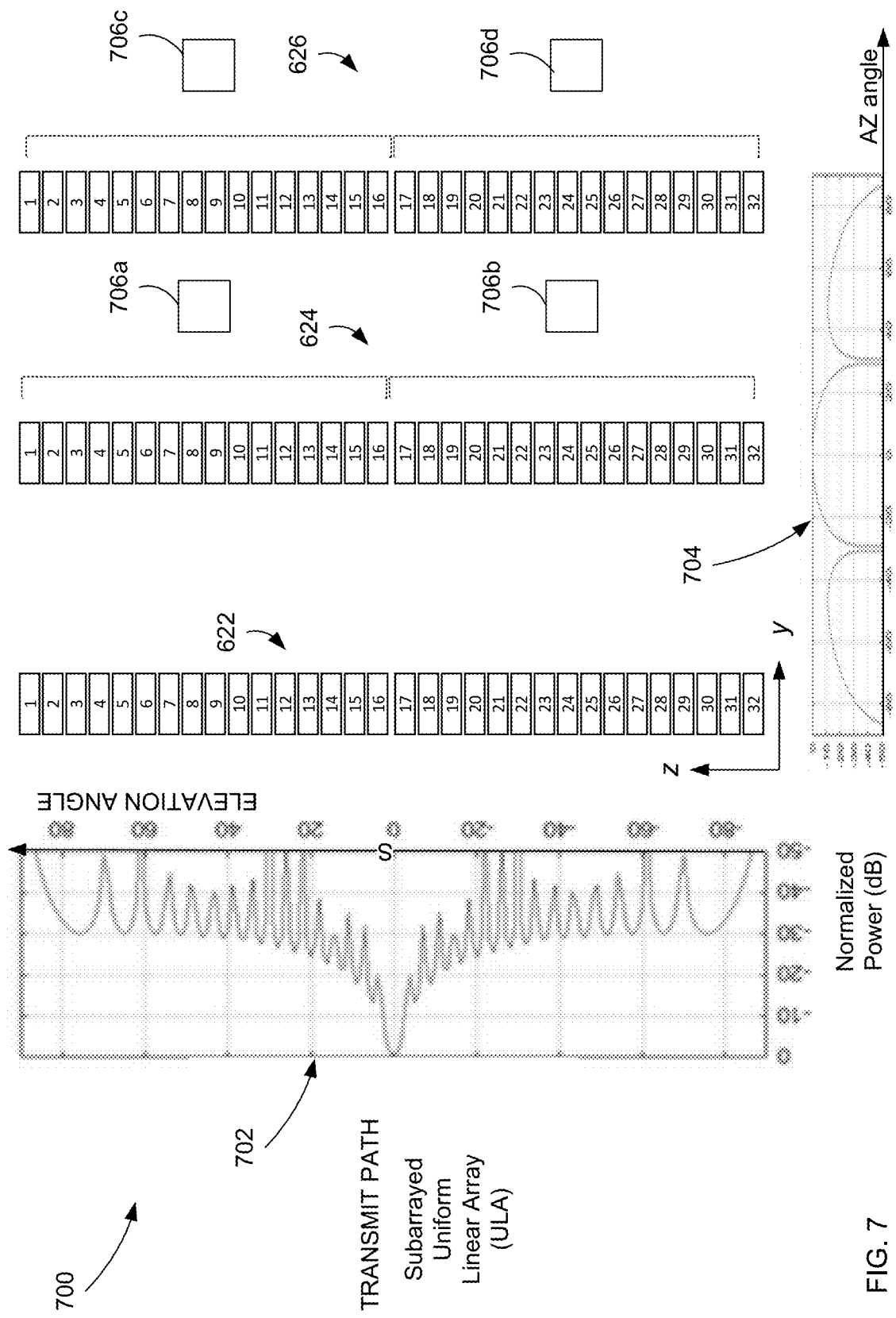
FIG. 7 illustrates a transmit antenna array of a hybrid beam steering radar system and corresponding azimuth and elevation behavior, in accordance with various implementations of the subject technology.

FIG. 7 illustrates the MIMO transmit antennas of FIG. 6, having several columns 622, 624, 626 and MMICs 706a, 706b, 706c, and 706d positioned proximate two columns 624 and 626. The resultant waveforms are illustrated for the transmit path of the subarrayed uniform linear array (ULA), transmit array 700. Each column of the array has a number of radiating elements. The fan beamform in the azimuth is illustrated by the waveform 504 and in elevation by waveform 502.

Figure 8:
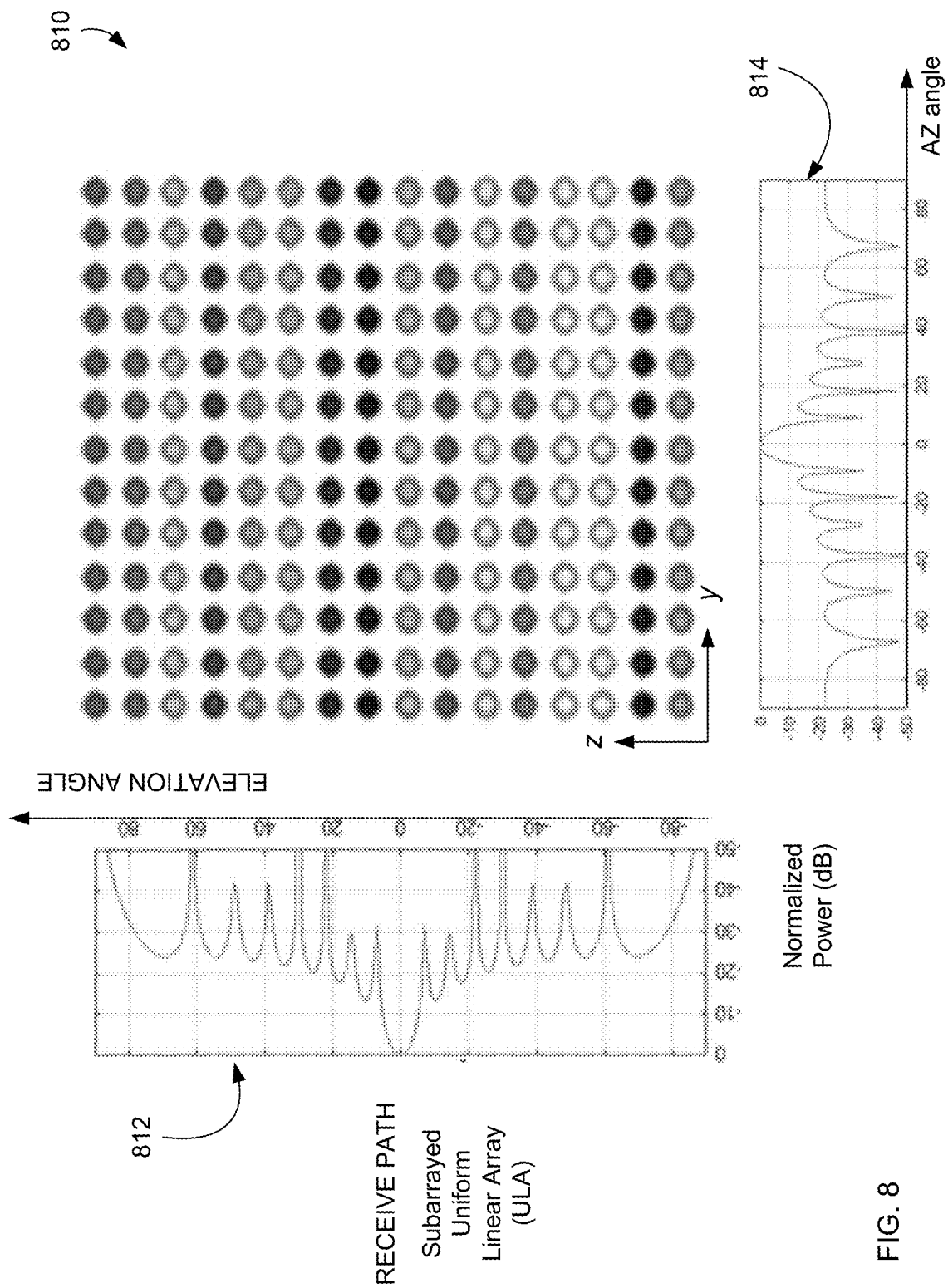
FIG. 8 illustrates a receive antenna array of a hybrid beam steering radar system and corresponding azimuth and elevation behavior, in accordance with various implementations of the subject technology.

The transmit array is illustrated in further detail corresponding output power levels (e.g., as normalized power in dB) for elevation angle 702 and azimuth angle 704 (AZ angle). The transmit arrays 622, 624, 626 are illustrated in proximity. FIG. 8 illustrates a receive array 810 and corresponding power levels for elevation angle 812 and azimuth angle 814 of the receive path.

In the examples of phased array antennas provided herein, when a return signal is received from a transmit signal, the waveforms of the receive array identify the location(s) in elevation by comparing signal strength to threshold value(s). The azimuth coordinate is identified by evaluation of signals received on channels of the receive array. In radar target detection, determining the threshold value(s) is a function of the probability of detection and probability of false alarm. A process of constant false alarm rate (CFAR) detection compares each cell or element to its neighbors and determines threshold value(s).

Figure 9:
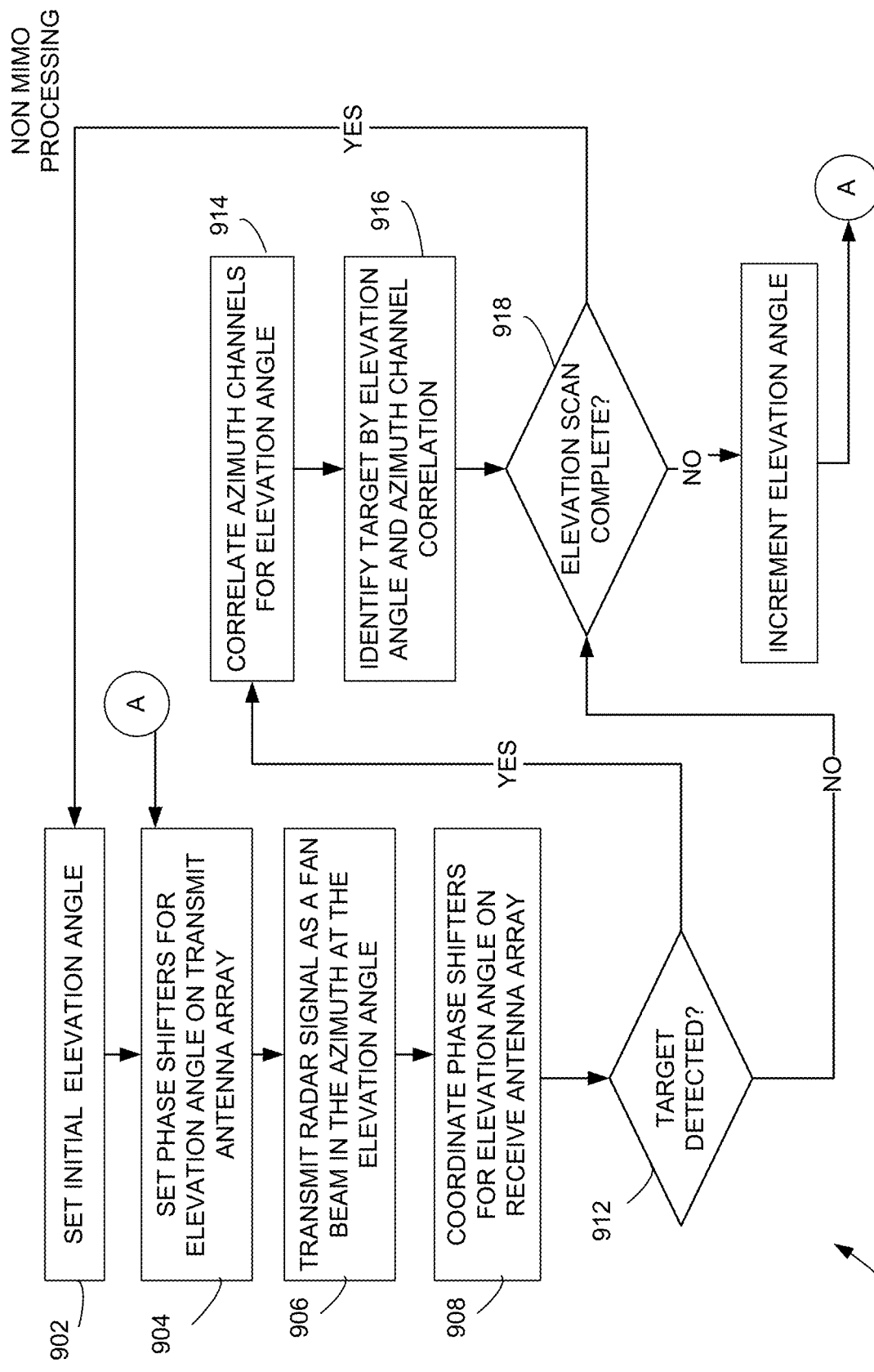
FIG. 9 illustrates a flow diagram for operation of a hybrid beam steering radar system, in accordance with various implementations of the subject technology.

FIG. 9 illustrates a process 900 for operation of a hybrid radar system, such as illustrated in FIG. 2, which transmits a fan beam in azimuth and scans at different elevation angles. The radar system sets an initial elevation angle, 902, which may be predetermined, calculated, dynamically adjusted as a function of operation and behavior, and so forth. The process 900 sets the phase shifters for the elevation angle on the transmit antenna array, 904. The radar system transmits a radar signal as a fan beam in the azimuth at the elevation angle, 906. The phase shifters at the receive antenna array are coordinated for the elevation angle, 908. On target detection, 912, the process 900 initiates correlation of azimuth channels at this elevation angle 914; else the process 900 continues to determine if the elevation scan is complete, 918. This may be determined by a set of elevation angles, a maximum elevation angle, a minimum number of elevation angles, or other criteria. When a target is detected, the process 900 identifies a location of the target be elevation angle and azimuth channel correlation, 916. If the elevation scan is complete, 918, and all elevation angles have been scanned, 918, processing returns to set the initial elevation angle, 902; else processing increments the elevation angle and returns to set phase shifters, 904.

Figure 10:
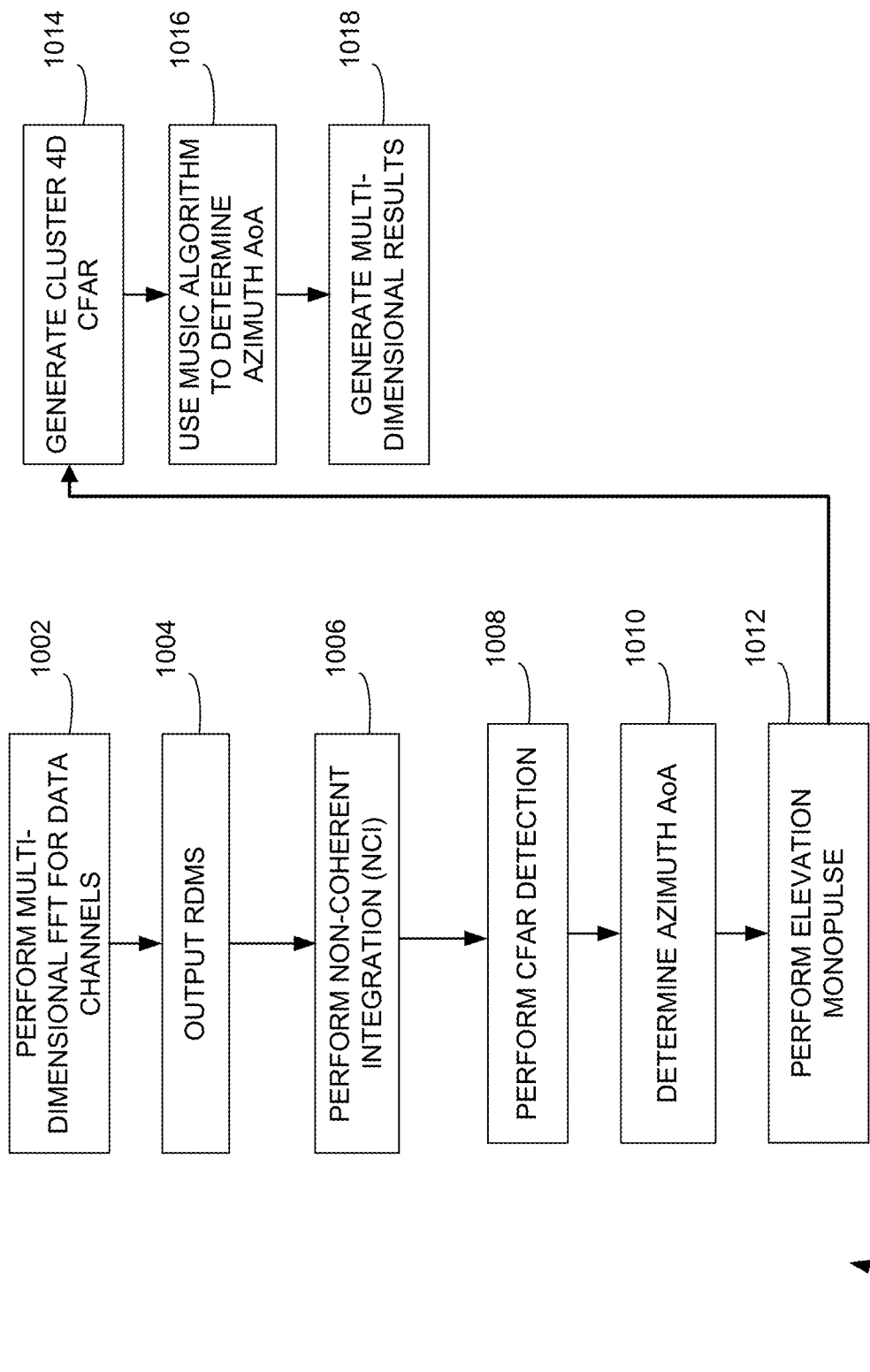
FIGS. 10-13 illustrate flow diagrams for azimuth angle of arrival (AoA) detection in a hybrid beam steering radar system, in accordance with various implementations of the subject technology.

The azimuth processing, as in step 914 of process 900, is further detailed in FIG. 10. As illustrated in FIG. 10, process 1000 performs multi-dimensional FFT for data channels, 1002 and outputs RDMs, 1004. The process performs non-coherent integration (NCI), 1006, and performs constant false alarm rate (CFAR) detection, 1008. From the NCI and CFAR, the angle of arrival (AoA) is determined, 1010, and in this example, the process 1000 performs elevation monopulse processing, generates cluster 4D CFAR, 1014 and determines azimuth AoA, 1016, providing 4D results, 1018.

Azimuth processing is performed on each CFAR detection, i, wherein inputs are complex RDMs. For each detection, an azimuth spatial sampling vector, D, is formed. Performing FFT on vector D to obtain a vector $D_{FFT}$. The peak azimuth angles are identified and the vector D is steered in the direction of each peak angle by a steering vector, S. In the present embodiment, tapering is applied to the steering vector, where the following defines the steered vector D, $Ds=(S*T)^{H}*D$, where T is the tapering vector and the operator * indicates multiplication of each element of each vector to generate a final vector, such as used in Matlab code. To evaluate coherent integration (CI) of each azimuth peak, the following relationship of power to data is applied:

$$P_{S,RDM_{indices}} = |D_{S,RDM_{indices}}|^2$$

Figure 11:
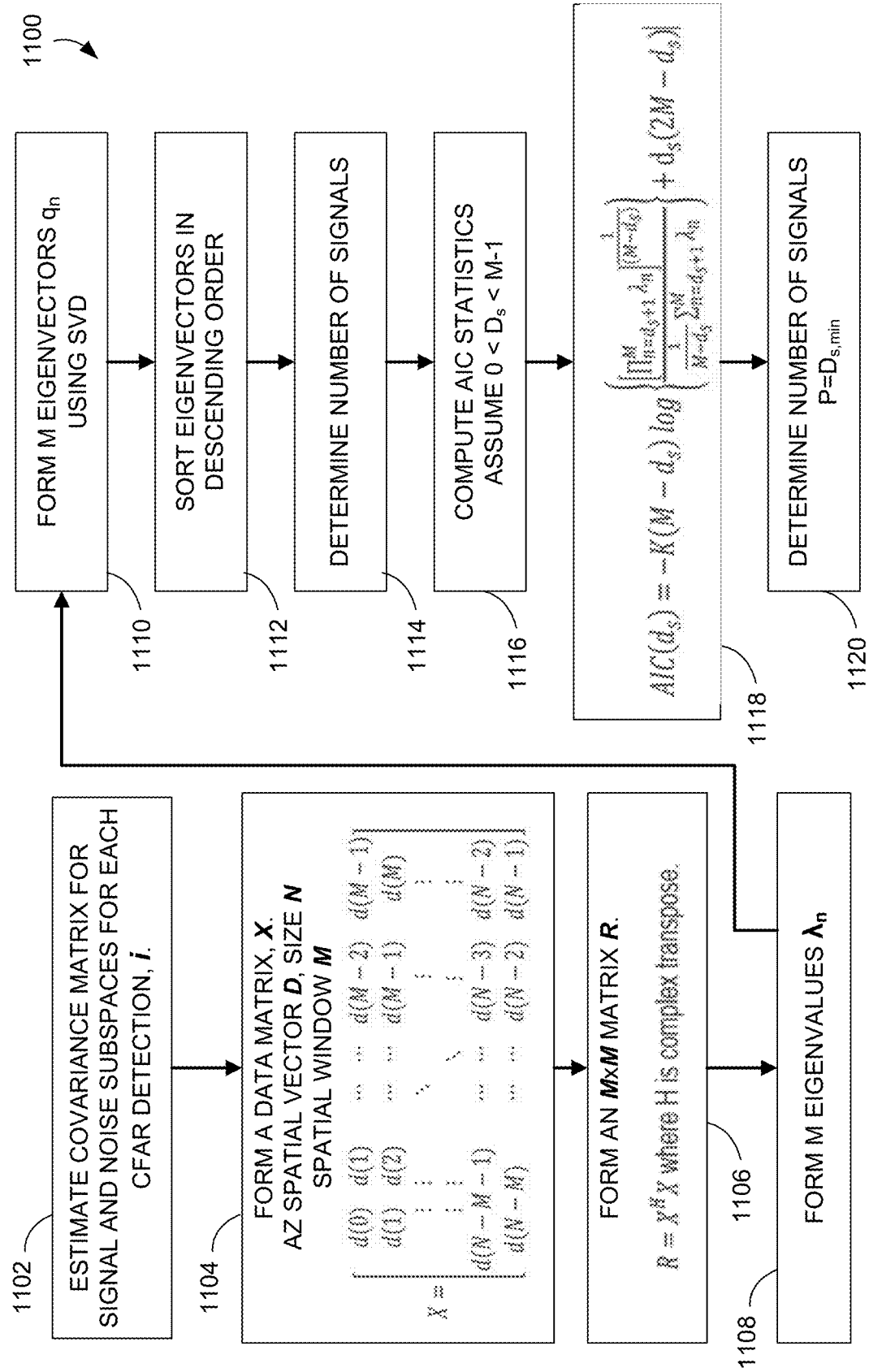
Figure 12:
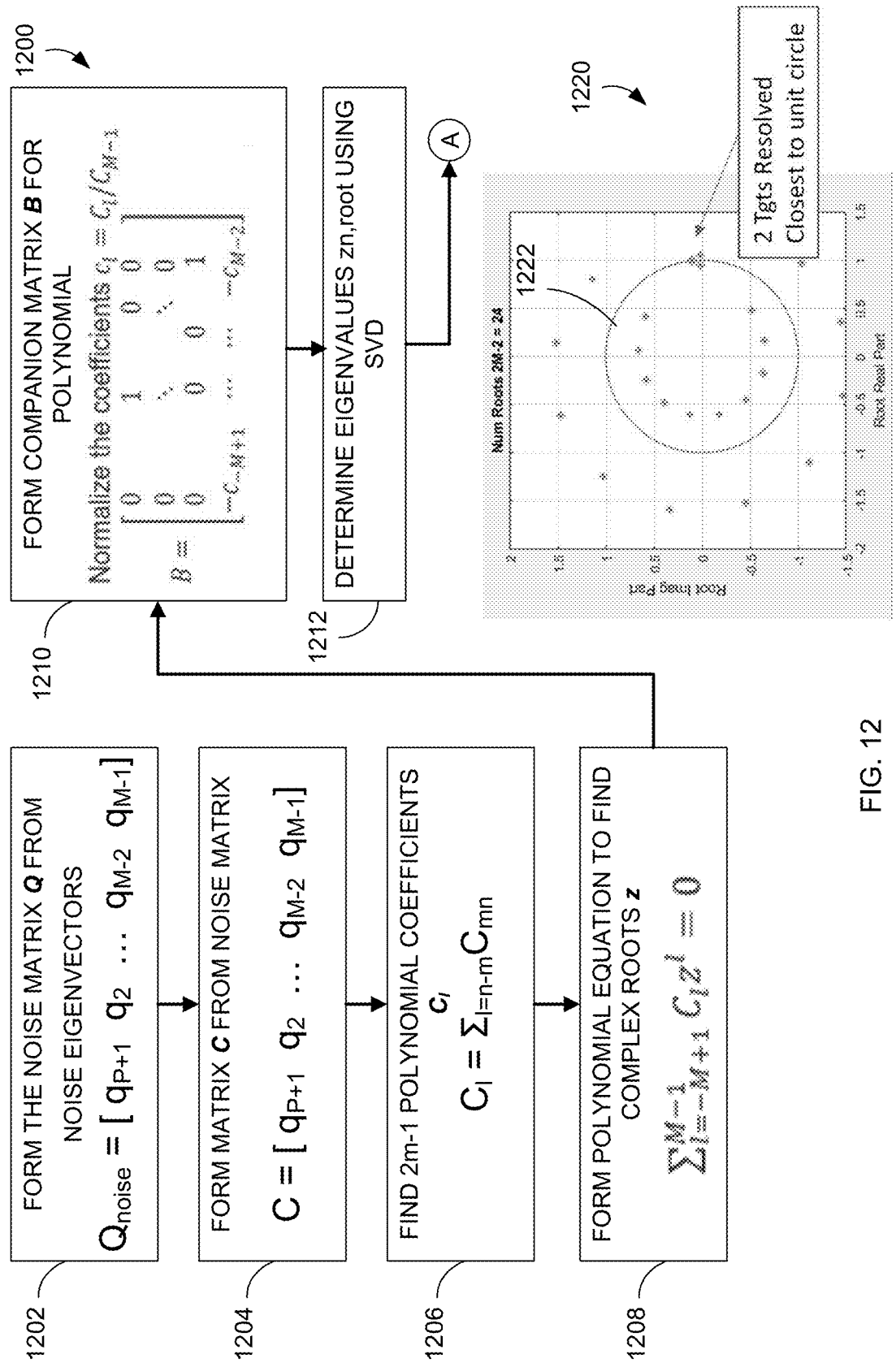
Figure 13:
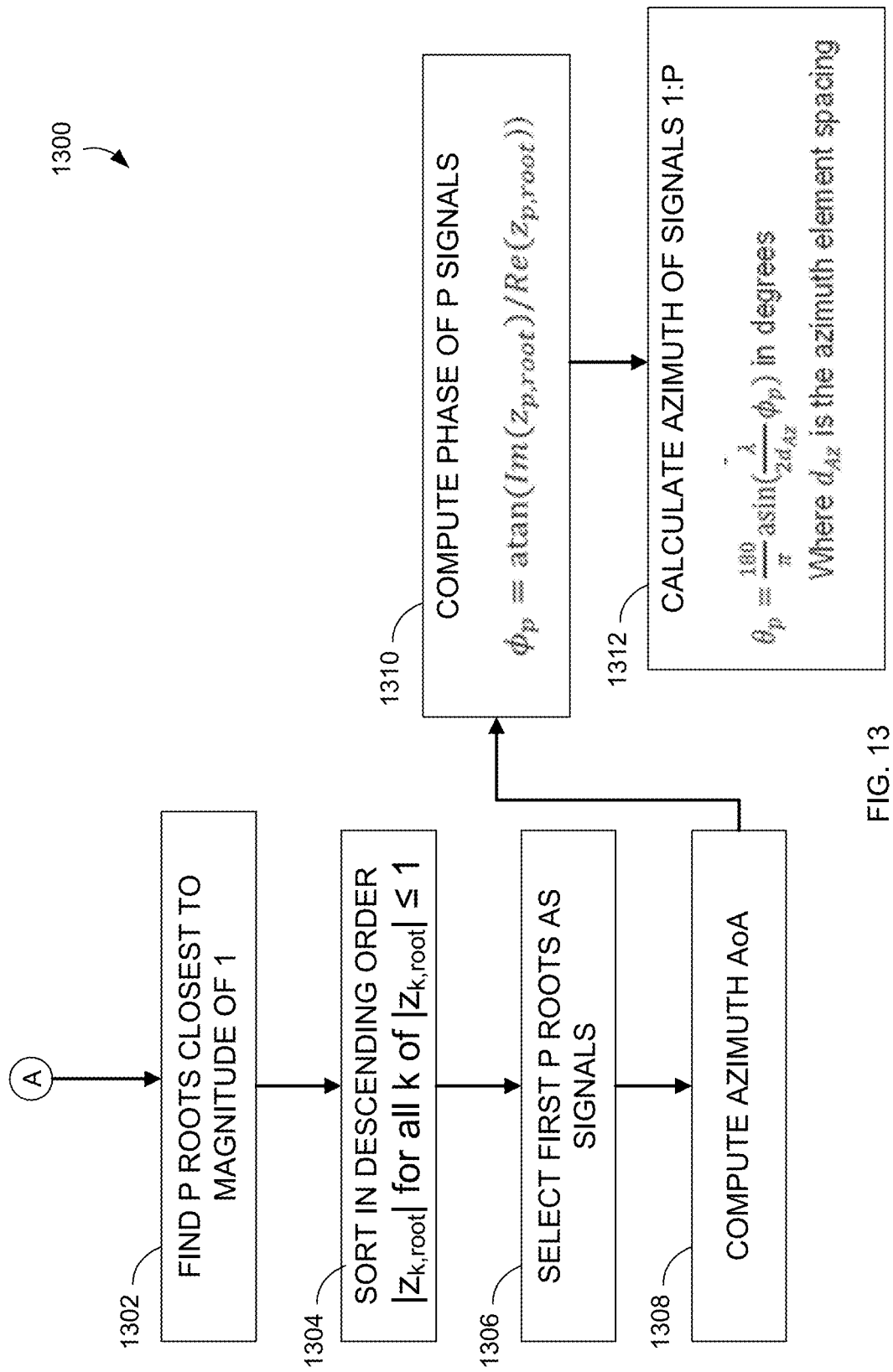

FIGS. 11-13 illustrate some tests and processing used in the operation of the hybrid radar system.

Continuing with processing as illustrated in FIG. 11, the hybrid radar system performing process 1100 is configured to estimate a covariance matrix for the receive signals and noise subspaces for each CFAR detection, i, 1102. A data matrix, X, is formed and an azimuth spatial vector, D, of size N and spatial window M, 1104. A matrix R is formed, 1106, having dimensions M×M, and M eigenvalues are formed, $\lambda_n$, 1108. The process 1100 continues to form M eigenvectors $q_n$ using singular value decomposition (SVD), 1110, or other QR decomposition. Sorting the eigenvectors in descending order, 1112, enables determination of the number of signals, 1114. The process then computes Akaike information criterion (AIC) statistics, 1116, using a given formula, 1118. From this determine the number of signals, 1120. FIGS. 11 and 12 detail the superressolution techniques referred to as root-music. Other superresolution techniques may be implemented. FIGS. 12 and 13 illustrate further details for the processes of operating the hybrid radar system.

Continuing with processing as illustrated in FIG. 12, the hybrid radar system performing process 1200 is configured to form the noise matrix Q from noise eigenvectors, 1202. The process 1200 continues to form matrix C from noise matrix Q, 1204, and find 2m-1 polynomial coefficients, 1206. The process 1200 continues to form polynomial equation to find complex roots z, which leads to form companion matrix B for polynomial, 1210, then determine eigenvalues $z_{n,root}$ using SVD. The resulting data is shown in an insert 1220 where a unit circle 1222 indicates two targets that are resolved by the plot of real and imaginary parts of the root.

Continuing with processing as illustrated in FIG. 13, the hybrid radar system performing process 1300 is configured to find P roots closes to magnitude of 1, 1302, sort in descending order, 1304, select first P roots as signals, 1306, then computes azimuth AoA, 1308, and compute phase of P signals, 1310, to calculate azimuth signals 1:P, 1312.

The hybrid radar systems, such as system 150 of FIG. 2 having a radiation beam as in FIG. 1, determine positions of targets in the azimuth direction by methods described herein, which use a correlation between antenna elements on the receive antenna array to determine signal strength and corresponding angle of arrival. In some examples, the system is adapted to detect multiple objects with an angular resolution sufficient for a given application, such as to distinguish between two vehicles, two bicycles and so forth. In some examples, detection of targets may be performed by a detection module, such as azimuth detection module 176 of FIG. 2.

Figure 14:
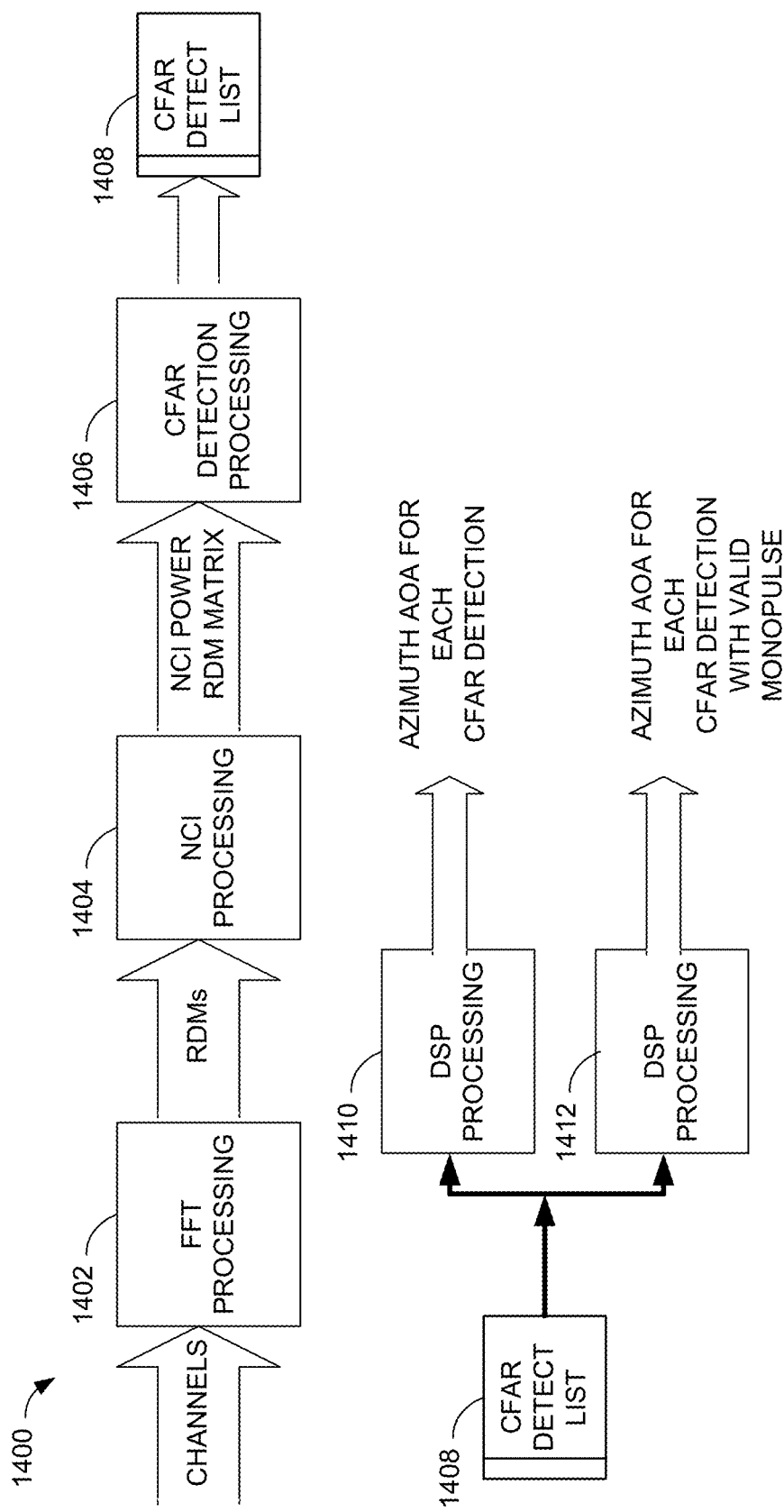
FIGS. 14-15 illustrate a functional diagram of azimuth angle of arrival detection and example behavior, in a hybrid beam steering radar system, in accordance with various implementations of the subject technology

FIG. 14 illustrates a functional block diagram 1400 for azimuth angle detection. Channel information is provided to FFT processing 1402 to determine the range and Doppler measurements, outputting range Doppler mappings (RDM). A non-coherent interference (NCI) processing 1404 receives the RDMs and generates NCI power RDM matrices, which are applied to CFAR detection processing 1406, which outputs a CFAR detection list 1408. The CFAR detection list 1408 is provided to digital signal processing (DSP) processing modules 1410, 1412 to calculate azimuth AoA for each CFAR detection and azimuth AoA for each CFAR detection with a valid monopulse.

Figure 15:
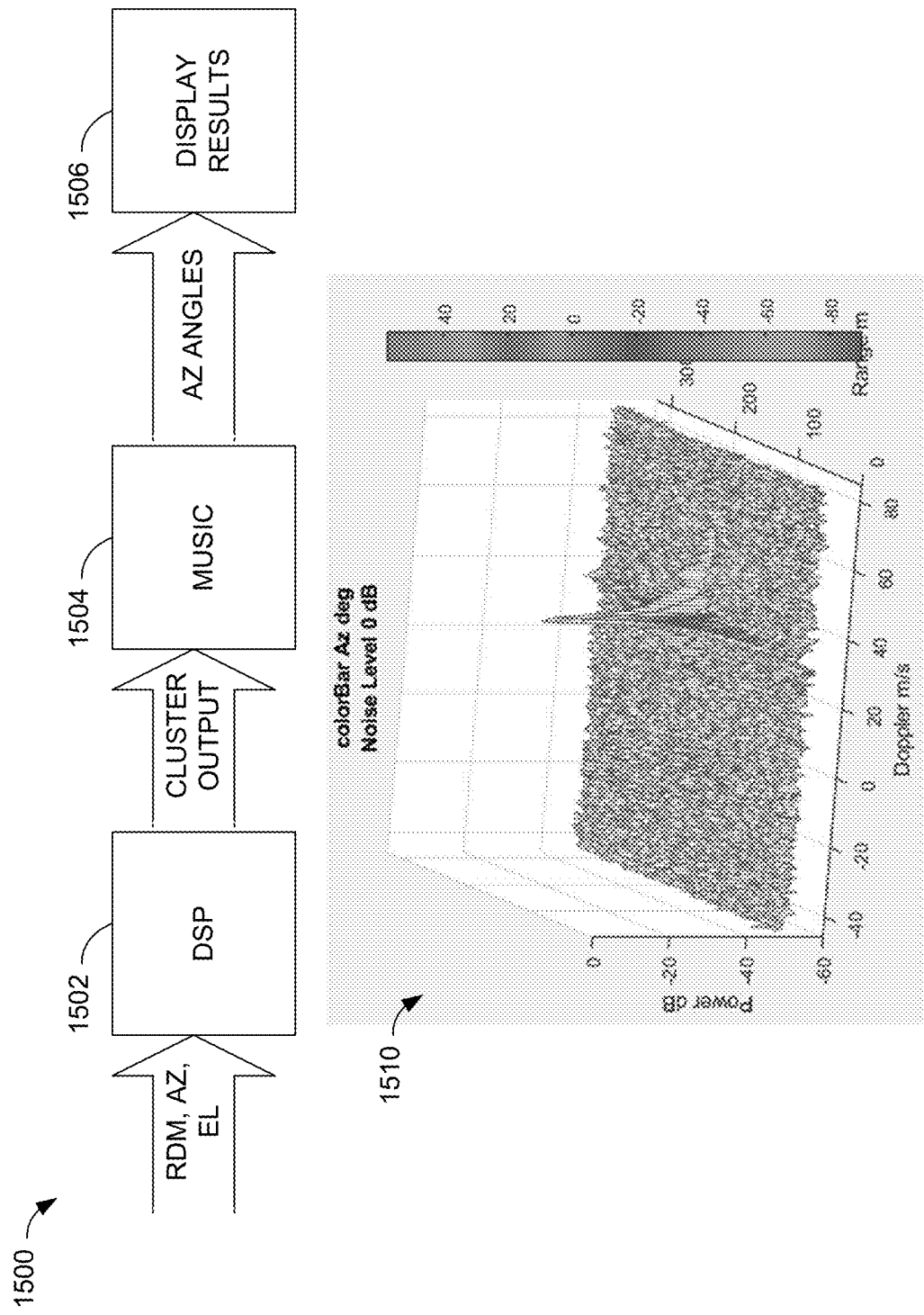

Continuing with processing, FIG. 15 illustrates a functional block diagram 1500 providing RDM, azimuth and elevation angles to DSP processing 1502 for clustering. The cluster outputs are provided to MUSIC algorithm processing 1504, where the azimuth angles are then provided to display results, 1506. An example of a display RDM is illustrated as mapping 1510.

Figure 16:
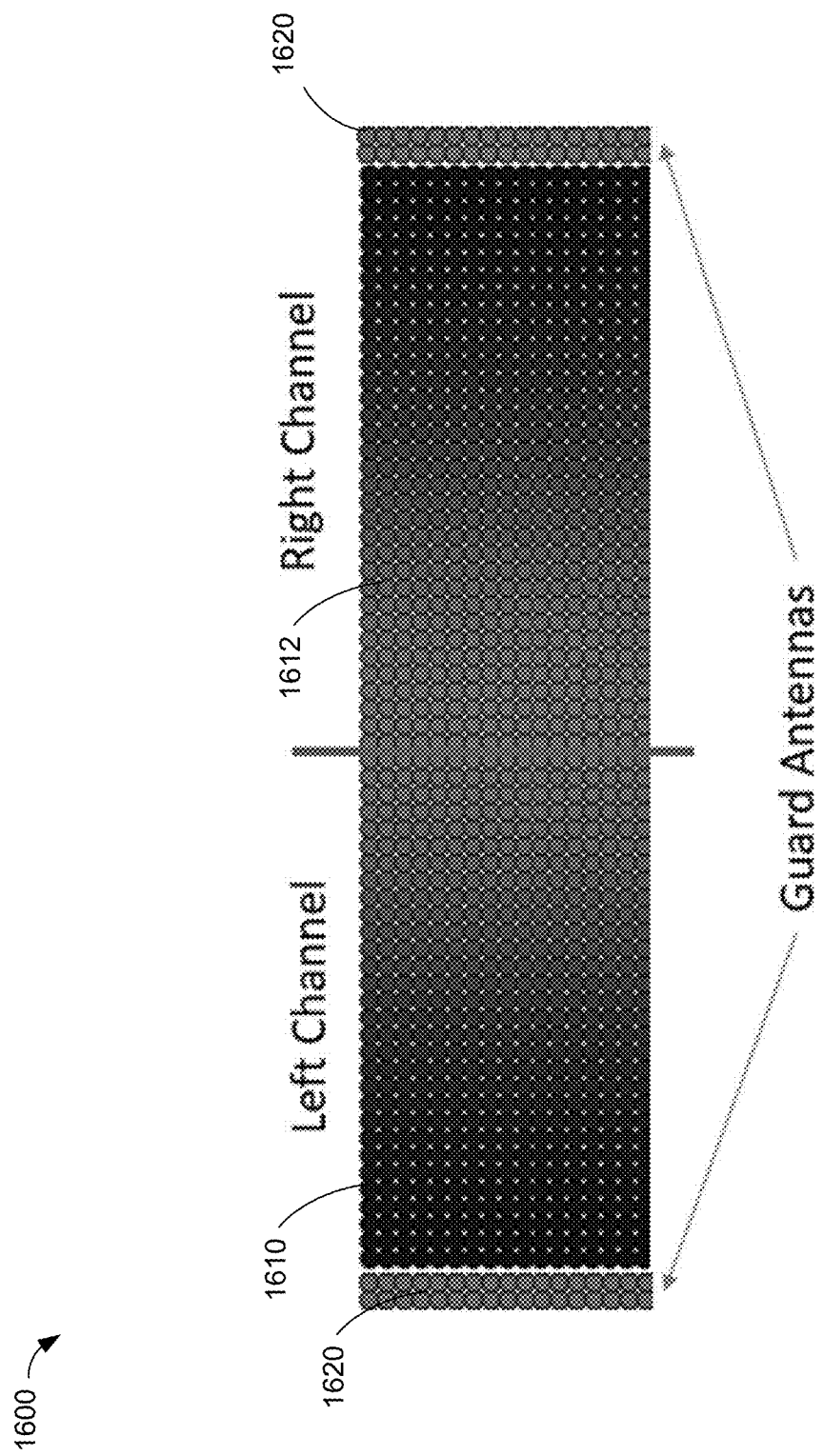
FIG. 16 illustrates a receive antenna configuration including guard bands in a hybrid beam steering radar system, in accordance with various implementations of the subject technology.

FIG. 16 illustrates a receive antenna configuration including guard bands in a hybrid beam steering radar system 1600, in accordance with various implementations of the subject technology. In some embodiments, guard antennas 1620 are added to the channels 1610, 1612 of an antenna array system 1600, such as illustrated in FIG. 16.

FIGS. 17 and 18 illustrate methods for Azimuth angle of arrival processing in a hybrid beam steering radar system, in accordance with various implementations of the subject technology. As illustrated in FIG. 17, the method 1700 begins with azimuth AoA processing on each CFAR detection i for inputs of complex RDMs 3 to 15, where each detection forms an Azimuth spatial sampling complex vector D. The method 1700 continues with determining FFT of AoA by performing FFT on the complex vector D and obtaining vector $D_{FFT}$, where peak azimuth finding includes angles $\alpha_{peak}$ at max peak plus peak 10 dB less than the max. The method 1700 continues with digitally steering complex vector D to the direction of each $\alpha_{peak}$ and by applying steering vector S with 30 dB tapering T, as illustrated in FIG. 17. The method 1700 further continues with coherent integration (CI) of each peak by computing CI amplitudes and power for the steered array; followed by valid monopulse flag set if the following two tests are passed: Sum to Guard Ratio Test and Monopulse Ratio Test, as illustrated in FIG. 17.

FIG. 18 continues with the method 1800, which includes angle measurement and variance estimate based on the equations illustrated in detail of FIG. 18.

FIG. 19 illustrates a method 1900 for elevation monopulse processing in a hybrid beam steering radar system, in accordance with various implementations of the subject technology. As illustrated, the method 1900 begins by performing monopulse processing on each detection i from CFAR processing for inputs of complex RDMs 1, 2, 3, 4, and 16. The method 1900 continues with coherent integration (CI) of CFAR RDM bins i by computing CI amplitudes and power for the combinations of RDMs, which are indicated by indices, as illustrated in FIG. 19. The method 1900 continues with valid monopulse flag set if the following two sets are passed: Sum to Guard Ratio Test and Monopulse Ratio Test, as illustrated in FIG. 19. This is followed by angle measurement and variance estimate of the method 1900 based on the equations illustrated in detail of FIG. 19.

Figure 20:
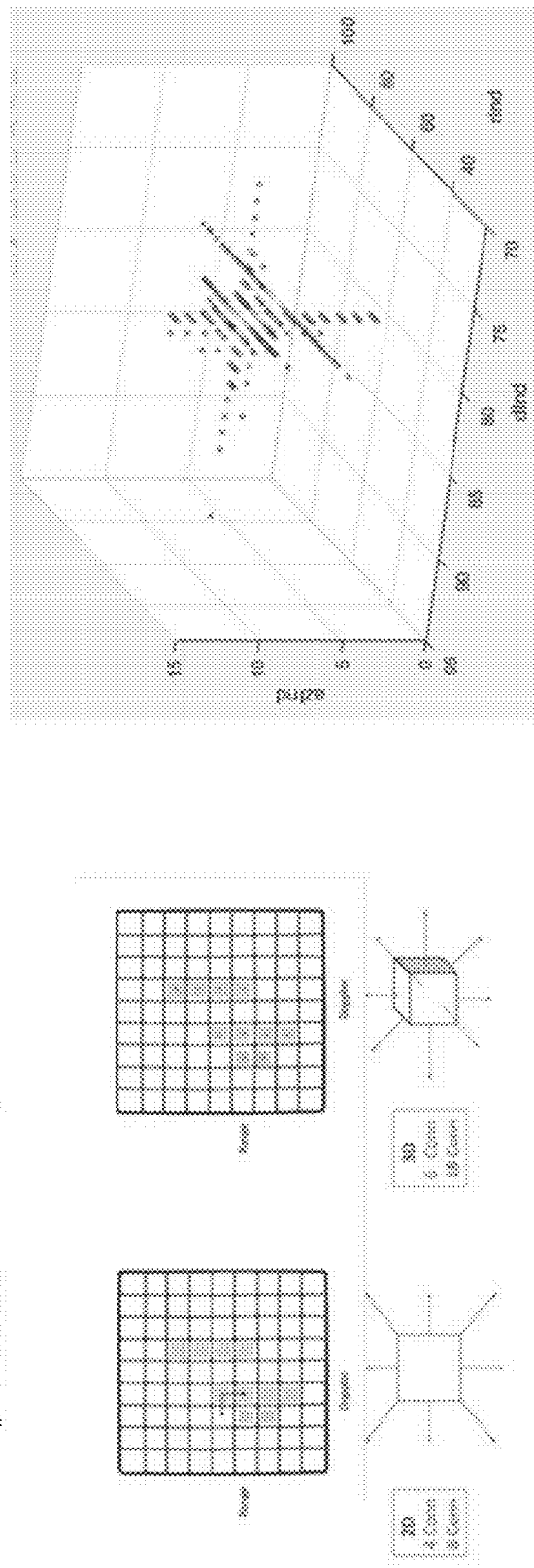
FIG. 20 illustrates a method for clustering processing and example behavior in a hybrid beam steering radar system, in accordance with various implementations of the subject technology.

FIG. 20 illustrates clustering processing 2000 and example behavior in a hybrid beam steering radar system by illustrating 4D clustering algorithm with dbScan or connected components.

FIGS. 21-23 illustrate azimuth angle of arrival processing in a hybrid beam steering radar system, in accordance with various implementations of the subject technology. As illustrated in FIG. 21, the method 2100 for performing azimuth AoA using Music (DSP) begins with estimating the covariance matrix for the signal and noise subspaces for each CFAR detection i by forming the data matrix X from the Az spatial vector D of size N=13 (nominal), by assuming a spatial window of M=10 (nominal). The method 2100 then continues with determining M eigenvalues $\lambda_n$ and corresponding M eigenvectors $q_n$ using SVD, e.g, by sorting the eigenvalues in descending order. The method 2100 continues with determining number of signals by computing the AIC statistic assuming the condition $0<d_s<M-1$ signals, and determining the number of signals $P=d_{s,\ min}$ as the index with the minimum AIC statistic.

Referring now to FIG. 22, the method 2200 begins with performing root music to: form the matrix Q from the noise eigenvectors; form the matrix C; determine the 2M−1 polynomial coefficients $C_i$; form polynomial equation to find the complex roots z; form the Companion Matrix B for the polynomial and determine the eigenvalues $z_{n,root}$ using SVD, QR deposition or equivalent.

FIG. 23 illustrates yet another method 2300 for performing azimuth AoA using Music (DSP) by first finding the P roots coolest to a magnitude of 1, by sorting the values in descending order and selecting the first P roots as the signal. The method 2300 continues to computer the azimuth AoA by computing the phase of the P signals and azimuth of the signals 1:P, as illustrated in detail in FIG. 23.

Figure 24:
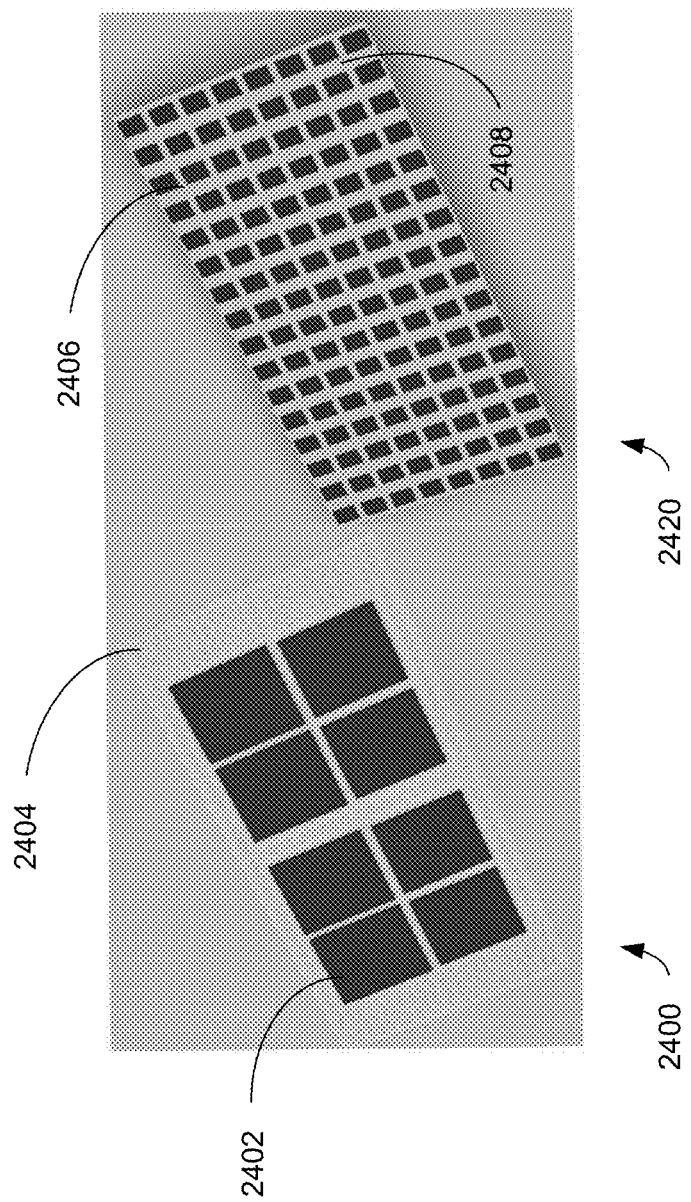
FIG. 24 illustrates tile configurations for a radar system, in accordance with various implementations of the subject technology.

FIG. 24 illustrates tile structures embodying transmit and receive arrays and MMIC phase shifting modules. The transmit and receive arrays and the phase shifting circuits may be organized in tiles. The tile structures 2400, 2420 are formed on substrates 2404, 2408, having individual tiles 2402, 2406. These may be configured in a variety of ways to accommodate different applications. Each tile includes an antenna array and integrated circuit for phase control, as well as other modules, connectors and circuitry for a given application(s). The tiles may be produced as an antenna in package (AiP) and placed on a common substrate. The number of such tiles and the configuration may be designed to meet specifications of an application. The specific design of an antenna array, including subarrays, may vary also. This provides a flexible design and may be built so as to be agnostic in application. The frequency of operation, phase shifts required, and behavior of the antenna will determine the size, shape and construction of the tile. The tiles 2400, 2420 include tiles in a regular configuration, however, these may be positioned in an irregular or an asymmetric format according to the desired behavior. The tiles may be similar in size, shape, material and other parameters, or they may be designed differently. In some embodiments, the individual tiles may be frequency specific, wherein each responds to a different frequency for a frequency-selective array.

These various examples of a beam steering radar support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The radar described here is effectively a "digital eye," having true 3D vision and capable of human-like interpretation of the world.

Figure 25:
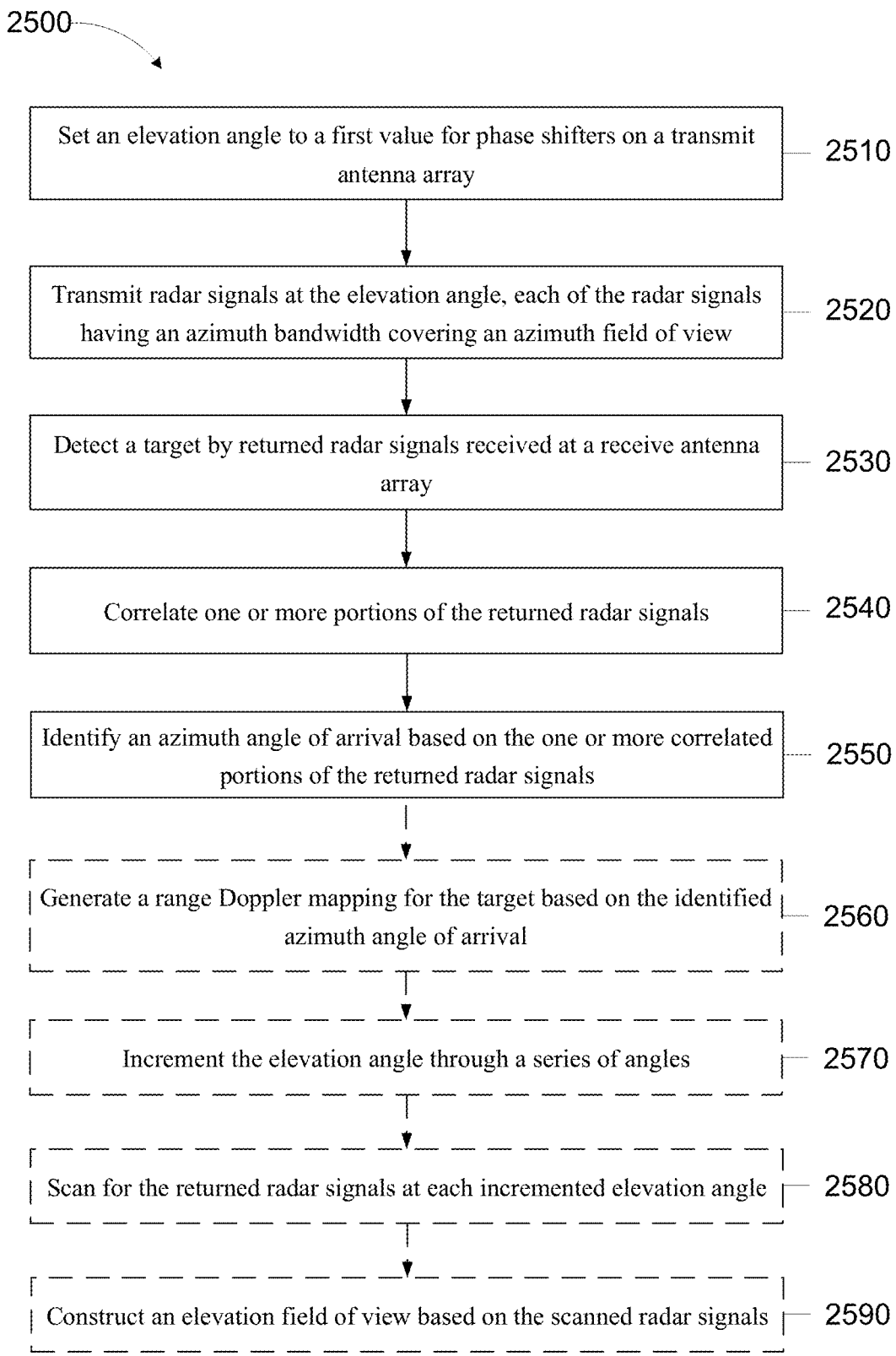
FIG. 25 illustrates a flow chart for a method of operation of a radar system (hybrid beam steering radar system), in accordance with various implementations of the subject technology.

FIG. 25 illustrates a flow chart for a method 2500 of operation of a radar system (hybrid beam steering radar system), in accordance with various implementations of the subject technology. The method 2500 includes, at step 2510, setting an elevation angle to a first value for phase shifters on a transmit antenna array; at step 2520, transmitting radar signals at the elevation angle, each of the radar signals having an azimuth bandwidth covering an azimuth field of view; at step 2530, detecting a target by returned radar signals received at a receive antenna array; at step 2540, correlating one or more portions of the returned radar signals; and at step 2550, identifying an azimuth angle of arrival based on the one or more correlated portions of the returned radar signals.

In various implementations, the method 2500 may optionally include, at step 2560, generating a range Doppler mapping for the target based on the identified azimuth angle of arrival. In various implementations, the method 2500 may optionally include, at step 2570, incrementing the elevation angle through a series of angles. In various implementations, the method 2500 may optionally include, at step 2580, scanning for the returned radar signals at each incremented elevation angle. In various implementations, the method 2500 may optionally include, at step 2590, constructing an elevation field of view based on the scanned radar signals.

In various implementations of the method 2500, the transmitted radar signals may include an elevation beamwidth and an azimuth beamwidth, where the azimuth beamwidth is greater than the elevation beamwidth. In some implementations, the elevation beamwidth is greater than the azimuth beamwidth.

In accordance with various embodiments, a hybrid radar system is provided in detail. The hybrid radar system may include one or more of the following: a transmit antenna array configured to generate a radio frequency (RF) beam covering an azimuth field of view and scanning a range of elevation angles; a receive antenna array configured to receive a reflected RF beam from an environment; a transceiver coupled to the transmit antenna array and the receive antenna array; an azimuth detection module coupled to the transceiver and configured to identify an azimuth angle of arrival upon detection of a target from the environment by correlation of at least a portion of the plurality of antenna elements; an antenna controller coupled to the transceiver; and a range Doppler mapping unit coupled to the antenna controller.

In various embodiments, the hybrid radar system may include a transmit phase shifter module coupled to the transmit antenna array; and a receive phase shifter module coupled to the receive antenna array. In some embodiments, settings of the transmit phase shifter module are capable of being used to control the receive phase shifter module. In various embodiments, the transmission beam is a fan beam and the elevation angles are incremented to cover an elevation field of view. In various embodiments, the azimuth detection module is further configured to correlate signal strength of received signals. In various embodiments, the receive antenna array comprises a plurality of rows of antenna elements. In various embodiments, the azimuth detection module is further configured to determine an azimuth angle of arrival as a function of a configuration of a portion of the plurality of rows of antenna elements. In various embodiments, the azimuth detection module is further configured to analyze a first signal returned from a first target received in a first row of the plurality of rows of antenna elements by comparing signal strengths received at antenna elements in the first row to signal strengths received at other rows in the plurality of rows of antenna elements.

In accordance with various implementations disclosed herein, a method of operating a radar system is provided. The method includes setting an elevation angle to a first value for phase shifters on a transmit antenna array; transmitting radar signals at the elevation angle, each of the radar signals having an azimuth bandwidth covering an azimuth field of view; detecting a target by returned radar signals received at a receive antenna array; correlating one or more portions of the returned radar signals; and/or identifying an azimuth angle of arrival based on the one or more correlated portions of the returned radar signals.

In various implementations, the method may further includes generating a range Doppler mapping for the target based on the identified azimuth angle of arrival. In various implementations, the method may further includes incrementing the elevation angle through a series of angles; scanning for the returned radar signals at each incremented elevation angle; and constructing an elevation field of view based on the scanned radar signals.

In various implementations, the transmitted radar signals may include an elevation beamwidth and an azimuth beamwidth, where the azimuth beamwidth is greater than the elevation beamwidth. In some implementations, the elevation beamwidth is greater than the azimuth beamwidth.

In accordance with various embodiments, a radar system is provided in detail. The radar system may include, for example, a transmit antenna having a plurality of antenna elements arranged in rows and columns; a receive antenna having a plurality of antenna elements arranged in rows and columns; a transceiver coupled to the transmit antenna and the receive antenna, the transceiver configured to control transmit beams having an azimuth fan beam; and a processing unit. In various embodiments, the radar system may include, a transceiver configured to control transmit beams having an elevation fan beam. In various embodiments, the processing unit includes a digital processing unit; a range Doppler mapping module; and an azimuth detection module coupled to the transceiver and configured to process received signals and identify an azimuth angle of arrival by correlating signals received at antenna elements in rows of the receive antenna.

In various embodiments, the radar system may also include a transmit phase shifter module coupled to the transceiver and to the transmit antenna. In some embodiments, the transmit phase shifter module is configured to transmit a signal having an elevation beamwidth and an azimuth beamwidth, the azimuth beamwidth being greater than the elevation beamwidth. In various embodiments, the phase shifted signals correspond to elevation angles in the transmission beams and wherein the transmit phase shifter module is further configured to increment elevation angles over a range of values to cover an elevation field of view.

In various embodiments, the radar system also includes a receive phase shifter module coupled to the transceiver and to the receive antenna. In various embodiments, the radar system can include an azimuth detection module configured to determine an azimuth angle of arrival as a function of rows of antenna elements in the receive antenna. This can be done by correlating signal strengths of signals received at the receive antenna to identify the azimuth angle of arrival. In various embodiments, the determined azimuth angle of arrival is used to perform elevation monopulse to generate a multi-dimensional range Doppler mapping.

In various embodiments and implementations, the transmit phase shifter module and the receive phase shifter module are millimeter integrated circuits (MMICs). In various embodiments, the radar system is a multiple-input multiple-output (MIMO) system. The MIMO system, for example, can include the plurality of antenna elements of the transmit antenna forms a first number of channels, and the transmit antenna can further include a second plurality of antenna elements. In various embodiments, the MIMO system is configured to create virtual antenna elements at the receive antenna.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A hybrid radar system, comprising:
a transmit antenna array configured to generate a radio frequency (RF) beam covering an azimuth field of view and scanning a range of elevation angles, wherein the transmit antenna array comprises a plurality of antenna elements configured for transmitting a transmit beam;
a receive antenna array configured to receive a reflected RF beam from an environment of a target;
a transceiver coupled to the transmit antenna array and the receive antenna array; and
an azimuth detection module coupled to the transceiver and configured to identify an azimuth angle of arrival upon a detection of the target from the environment by correlation of signals transmitted from at least a portion of the plurality of antenna elements, wherein the azimuth detection module is further configured to determine the azimuth angle of arrival of the detected target by:
(i) performing a multi-dimensional Fast Fourier Transform (FFT) of the correlated signals transmitted from the at least a portion of the plurality of antenna elements, and
(ii) performing non-coherent integration and constant false alarm rate detection of the signals.

2. The hybrid radar system of claim 1, further comprising:
a transmit phase shifter module coupled to the transmit antenna array; and
a receive phase shifter module coupled to the receive antenna array,
wherein settings of the transmit phase shifter module are adjusted to control the receive phase shifter module.

3. The hybrid radar system of claim 1, wherein the transmit beam is a fan beam and the elevation angles are incremented to cover an elevation field of view.

4. The hybrid radar system of claim 1, wherein the azimuth detection module is further configured to correlate a signal strength of received signals.

5. The hybrid radar system of claim 1, wherein the receive antenna array comprises a plurality of rows of antenna elements.

6. The hybrid radar system of claim 5, wherein the azimuth detection module is further configured to determine an azimuth angle of arrival as a function of a configuration of a portion of the plurality of rows of antenna elements.

7. The hybrid radar system of claim 5, wherein the azimuth detection module is further configured to analyze a first signal returned from a first target received in a first row of the plurality of rows of antenna elements by comparing signal strengths received at antenna elements in the first row to signal strengths received at other rows in the plurality of rows of antenna elements.

8. A method of operating a radar system, comprising:
setting an elevation angle to a first value for phase shifters on a transmit antenna array;
transmitting radar signals at the elevation angle, each of the radar signals having an azimuth bandwidth covering an azimuth field of view;
detecting a target by returned radar signals received at a receive antenna array;
correlating one or more portions of the returned radar signals;
identifying an azimuth angle of arrival based on the one or more correlated portions of the returned radar signals by:
(i) performing a multi-dimensional Fast Fourier Transform (FFT) of the returned radar signals, and
(ii) performing non-coherent integration and constant false alarm rate detection of the returned radar signals; and
generating a range Doppler mapping for the target based on the identified azimuth angle of arrival.

9. The method of claim 8, further comprising:
incrementing the elevation angle through a series of angles;
scanning for the returned radar signals at each incremented elevation angle; and
constructing an elevation field of view based on the scanned radar signals.

10. The method of claim 8, wherein the transmitted radar signals comprise an elevation beamwidth and an azimuth beamwidth, the azimuth beamwidth being greater than the elevation beamwidth.

11. A radar system, comprising:
a transmit antenna having a plurality of antenna elements arranged in rows and columns;
a receive antenna having a plurality of antenna elements arranged in rows and columns;
a transceiver coupled to the transmit antenna and the receive antenna, the transceiver configured to control transmit beams having an azimuth fan beam; and
an azimuth detection module coupled to the transceiver and configured to process received signals and identify an azimuth angle of arrival of a target by correlating signals received at antenna elements in rows of the receive antenna, wherein the azimuth detection module is further configured to determine the azimuth angle of arrival of the target by:

(i) performing a multi-dimensional Fast Fourier Transform (FFT) of the correlated signals received at the antenna elements in rows of the receive antenna, and (ii) performing non-coherent integration and constant false alarm rate detection of the correlated signals.

12. The radar system of claim 11, further comprising:

a transmit phase shifter module coupled to the transceiver and to the transmit antenna, wherein the transmit phase shifter module is configured to transmit a signal having an elevation beamwidth and an azimuth beamwidth, the azimuth beamwidth being greater than the elevation beamwidth.

13. The radar system of claim 12, wherein phase shifted signals correspond to elevation angles in the transmit beams and wherein the transmit phase shifter module is further configured to increment elevation angles over a range of values to cover an elevation field of view.

14. The radar system of claim 11, further comprising:

a receive phase shifter module coupled to the transceiver and to the receive antenna.

15. The radar system of claim 11, further comprising:

an azimuth detection module configured to determine an azimuth angle of arrival as a function of rows of antenna elements in the receive antenna by correlating signal strengths of signals received at the receive antenna to identify the azimuth angle of arrival.

16. The radar system of claim 15, wherein the determined azimuth angle of arrival is used to perform elevation monopulse to generate a multi-dimensional range Doppler mapping.

17. The radar system of claim 11, wherein the transmit phase shifter module and the receive phase shifter module are millimeter integrated circuits (MMICs).

18. The radar system of claim 11, wherein the radar system is a multiple-input multiple-output (MIMO) system, wherein:

the plurality of antenna elements of the transmit antenna forms a first number of channels, and the transmit antenna further comprises a second plurality of antenna elements.

19. The radar system of claim 18, wherein the MIMO system is configured to create virtual antenna elements at the receive antenna.

* * * * *